(12) United States Patent
Sin et al.

(10) Patent No.: US 9,899,003 B2
(45) Date of Patent: Feb. 20, 2018

(54) DISPLAY SYSTEM

(71) Applicant: SMART SHOWCASE LIMITED, Hong Kong (HK)

(72) Inventors: Ka Leung Sin, Hong Kong (CN); Jason Felix Tsz-Kiu Chiu, Hong Kong (CN)

(73) Assignee: SMART SHOWCASE LIMITED, Hong Kong (CN)

( * ) Notice: Subject to any disclaimer, the term of this patent is extended or adjusted under 35 U.S.C. 154(b) by 0 days.

(21) Appl. No.: 14/535,195

(22) Filed: Nov. 6, 2014

(65) Prior Publication Data

US 2015/0124164 A1 May 7, 2015
US 2017/0287440 A9 Oct. 5, 2017

(30) Foreign Application Priority Data

Nov. 6, 2013 (CN) .......................... 2013 1 0545557

(51) Int. Cl.
| | |
|---|---|
| *G09G 5/12* | (2006.01) |
| *G06F 3/147* | (2006.01) |
| *H04N 5/222* | (2006.01) |
| *H04N 5/60* | (2006.01) |
| *H04N 5/66* | (2006.01) |
| *A47F 3/08* | (2006.01) |
| *G09F 27/00* | (2006.01) |

(Continued)

(52) U.S. Cl.
CPC ................. *G09G 5/12* (2013.01); *A47F 3/08* (2013.01); *A47F 11/06* (2013.01); *G06F 3/147* (2013.01); *G06F 3/1446* (2013.01); *G09F 27/00* (2013.01); *H04N 5/222* (2013.01); *H04N 5/60* (2013.01); *H04N 5/64* (2013.01); *H04N 5/66* (2013.01); *G09G 3/001* (2013.01); *G09G 2340/0464* (2013.01); *G09G 2340/14* (2013.01); *G09G 2360/04* (2013.01); *G09G 2360/141* (2013.01); *G09G 2380/00* (2013.01)

(58) Field of Classification Search
CPC .................................................. G06T 19/006
See application file for complete search history.

(56) References Cited

U.S. PATENT DOCUMENTS 1,589,432 A * 6/1926 Sapp ...................... A63H 13/00
40/411
3,476,385 A * 11/1969 Foy .......................... A63J 5/12
212/74

(Continued)

FOREIGN PATENT DOCUMENTS

| CN | 1739426 A | 3/2006 |
|---|---|---|
| CN | 101438908 A | 5/2009 |

(Continued)

*Primary Examiner* — Michael Teitelbaum
(74) *Attorney, Agent, or Firm* — Bowen Liu; Jennifer A. Haynes; David Lewis

(57) ABSTRACT

A display system and a method for displaying items and/or performances is provided. At least a display panel is used to play multimedia content. In an embodiment, at least a portion of the display panel turns transparent for displaying items or performances in a display space. In an embodiment, the display item is moved in accordance with the multimedia played on the display panel. In an embodiment, light effects are adjusted during the display. In an embodiment, audio media is played and adjusted during the display.

53 Claims, 25 Drawing Sheets

(51) Int. Cl.
*A47F 11/06* (2006.01)
*H04N 5/64* (2006.01)
*G09G 3/00* (2006.01)
*G06F 3/14* (2006.01)

(56) References Cited

U.S. PATENT DOCUMENTS

| | | | |
|---|---|---|---|
| 2009/0134802 A1 | 5/2009 | Oketani et al. | |
| 2013/0207896 A1* | 8/2013 | Robinson | G06F 3/013 345/158 |
| 2014/0009720 A1* | 1/2014 | Huang | G02F 1/133603 349/61 |
| 2014/0321024 A1* | 10/2014 | Smoot | H02N 15/02 361/225 |
| 2015/0002747 A1 | 1/2015 | Lee et al. | |
| 2015/0334336 A1 | 11/2015 | Chiu et al. | |
| 2016/0202786 A1 | 7/2016 | Lee et al. | |

FOREIGN PATENT DOCUMENTS

| | | |
|---|---|---|
| CN | 201617521 U | 11/2010 |
| CN | 101912213 A | 12/2010 |
| CN | 202230679 U | 5/2012 |
| CN | 102819989 A | 12/2012 |
| CN | 202816284 U | 3/2013 |
| CN | 203160751 U | 8/2013 |
| CN | 103282951 A | 9/2013 |
| CN | 203257143 U | 10/2013 |
| CN | 103504881 A | 1/2014 |
| CN | 103622392 A | 3/2014 |
| CN | 104077986 A | 10/2014 |
| CN | 102819989 B | 3/2015 |
| CN | 103243938 B | 5/2015 |
| DE | 202006019314 U1 | 4/2007 |
| WO | WO 2013/048146 A2 | 4/2013 |
| WO | WO 2013/069977 A1 | 5/2013 |

* cited by examiner

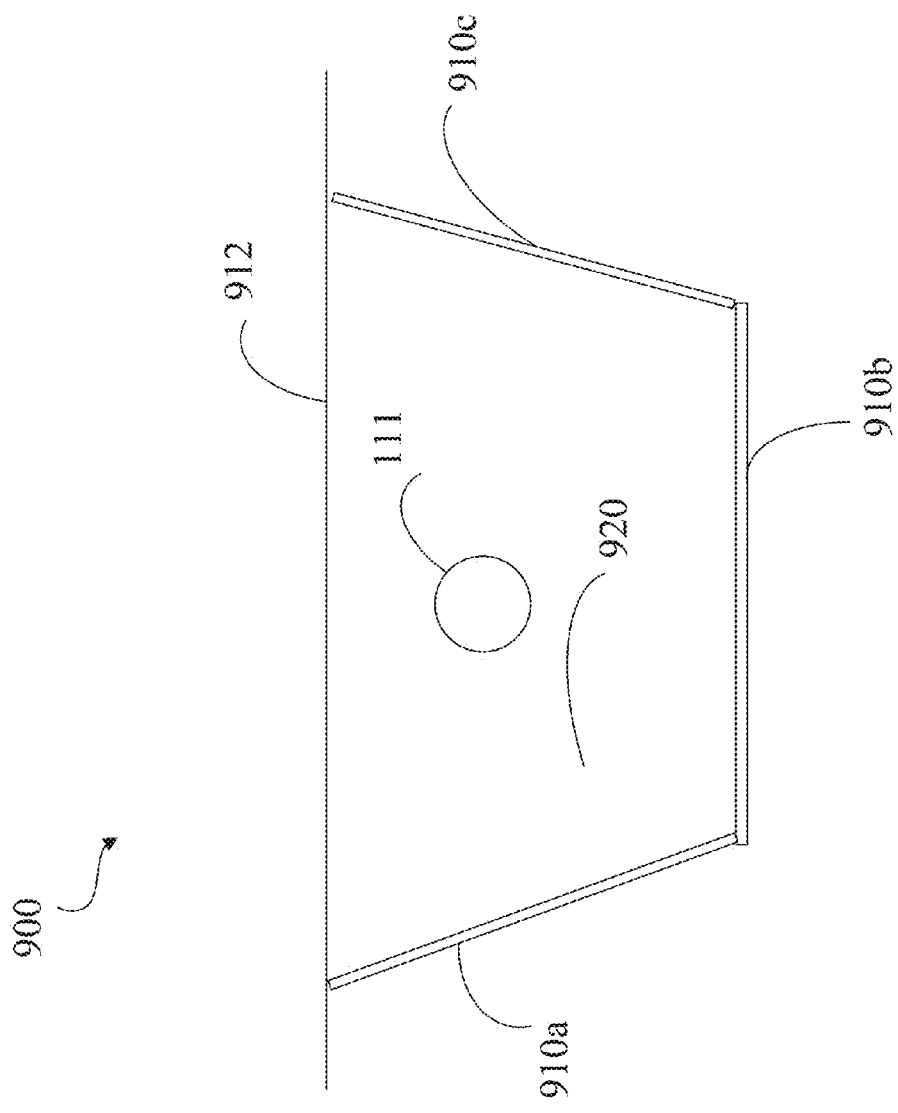

DISPLAY SYSTEM

CROSS-REFERENCE TO RELATED APPLICATIONS

This application claims priority benefit of Chinese Patent Application Number CN 201310545557.9, entitled "A TRANSPARENT SHOW CASE," filed on Nov. 6, 2013, by Ka-Leung Sin and Jason Felix Chiu Tsz Kiu and, which is incorporated herein by reference.

FIELD

The present specification relates to a display system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In the evolution of display panels, one direction is related to transparent display panels. Current display panel technologies include transparent liquid-crystal display (TLCD), organic light-emitting diode (OLED), plasma display panel, as well as transparent holographic rear projection film. Samsung announced that sample products of 22" TLCD were produced from March 2011. Samsung also produced TLCD of larger sizes (e.g., 46" in size).

One of the applications of transparent display panels is to build transparent showcases. Current showcases may use one transparent display panel on a side of the showcase to display merchandise inside the showcase to the public that face the transparent display panel. The transparent display panels can play commercial and/or promotional videos or other multimedia content while at the same time allow people to see through the transparent display panels and observe the merchandise inside showcases. A turntable may be installed inside the showcase and rotates to show different sides of merchandise in accordance with the video played on the transparent display panel.

In current showcases, the movements of display items are very limited (e.g., currently only rotational movement on a turntable), which limit the display of items and the multimedia played on the display panels. For example, if the display item is placed on the left side of the showcase and needs to be seen through the left part of display panel, the video played on the left side of display panel, if any, would have to be in light color to make the left part of the display panel transparent or semi-transparent. Thus, the part of display panel that shows the video in full color thus would be limited to the right part of display panel that is opaque. Even if a turntable is used to rotate the display item, movement of item is limited to rotation on the turntable. Furthermore, current showcases may not recognize the use of light effects to enhance the presentation of the display items. The use of current showcases is limited to display merchandise or products, without showing combinations of movements of items and display of performances (e.g., processes such as tours or shows on stage). This specification recognizes the needs to improve the showcases or display systems with the use of display panels to create a more attractive presentation of exhibitions or performances.

Some showcases have been disclosed in China Patent Application number CN 201210315770.6 and China Patent Application number CN201220495946.6, which are hereby incorporated by reference.

SUMMARY

In view of the above deficiencies, in at least one embodiment a display system and a method for displaying items and/or performances in such system are provided for enhancing the attractiveness of the display system and improving effect of presentation of exhibitions and/or performances.

In at least one embodiment, the display system includes at least one display panel and a display space for displaying items and/or performances. In at least one embodiment, the display panel may show multimedia content on either or both sides of the display panel. In at least one embodiment, a portion of the display panel may turn transparent or semi-transparent that allows the viewers to see through and observe items or performances in the display space. In at least one embodiment, at least a portion of the display panel that shows multimedia content may be opaque or semi-transparent. In at least one embodiment, the display panel may show multimedia content toward the outside of display system, or toward the inside of display space. In at least one embodiment, one or more display panels may be installed on one or more sides of showcases, on the walls of buildings, on windows, or may replace glass of windows of shops or vehicles. In at least one embodiment, the display panel may be of any shape and/or size.

In at least one embodiment, the display space is defined by the display panel, modules and/or devices of the display system, and/or structures of environment where the display system is installed. In at least one embodiment, the display system includes one or more boards that may be on the top of, at the bottom of, and/or on the sides of the display system to define the display space. In at least one embodiment, the display space may be defined and/or limited by illumination by the lighting module. In another embodiment, the display system may be installed in an open environment. In at least one embodiment, the display system may adapt to different environment and/or meet different requirements of exhibitions and/or performances. In at least one embodiment, the display system also includes at least a concealed space for storing items and/or performers that are not displayed in certain time or circumstances. In at least one embodiment, the concealed space may be at any location of the display system or external to the display system.

In at least one embodiment, display system includes a control module that communicates with the display panel and at least a motion module via wired or wireless connections. In at least one embodiment, the control module sends control commands to the display panel to modulate the transparency of the display panel and multimedia content that are played on the display panel. In at least one embodiment, control module sends control commands to the motion module to move the display items and/or performers in the display space, and/or between the display space and concealed spaces. In at least one embodiment, the motion module may include motors that drive mechanical devices including, but not limited to, pulley systems, gear wheels, turntables, gear systems, and elevation devices. In at least one embodiment, the motion module includes non-mechanical and/or non-contact devices, such as levitation devices that utilize electromagnetic field or wind control method to move items and/or performers.

In at least one embodiment, the control module sends control commands to a lighting module for controlling and/or adjusting light effects in the display system. In at least one embodiment, the lighting module controls the light effects, such as on-and-off lighting devices, brightness, duration of time, beaming angles, and/or colors of lights. In at least one embodiment, the control module also sends control commands to a sound module to control the audio effects in the display system. In at least one embodiment, the control module may include interfaces for receiving signals and/or commands from external devices or terminals via wired or wireless communications. In at least one embodiment, the display system may include input devices and/or an interface to receive input commands from viewers or users. In at least one embodiment, the control module receives signals from sensors that are installed on or are external to the display system, allowing interaction between viewers and the display system.

In at least one embodiment, multiple display systems may be joined together and may together play multimedia content, as a whole or separately. In at least one embodiment, display system may include multiple display panels that may or may not be in multiple display spaces to display one or more items and/or performers. In at least one embodiment, one or more display panels may segregate/divide a display space into multiple portions.

In at least one embodiment, the movement of items and/or performers, the lighting effects, and/or the audio effects are coordinated so that the display of items and/or performers is synchronized with the multimedia content on the display panel. In at least one embodiment, the motion module, lighting module, and/or the sound module are coordinated by the control module using stored programs or control programs, which may be received from external sources, to highlight the exhibitions and/or performances. In at least one embodiment, display system may display and/or imitate processes based on requirements of exhibitions and/or performances, or based on user interactions with the display system. At least one embodiment of the display system enhances visual and audio effects of the exhibitions and/or performances in combination with multiply types of media played on the display panel to attract more attention of the viewers.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

FIG. 9 shows a block diagram of an embodiment of a display system including multiple display panels;

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

It should be understood that specific embodiments described herein are only used to explain at least one embodiment but not used to limit the present invention.

To facilitate understanding of the embodiments of the specification, a few terms are defined as follows.

Multimedia content refers to contents that may include any of, or any combination of, content forms including, but not limited to, text, audio, still images, animation, video, and/or interactive content forms.

A showcase refers to a case or box for displaying merchandise and/or valuable items. Additionally or alternatively the showcase may display a setting and/or occasion. Additionally or alternatively, the showcase may include a medium for exhibiting something and/or someone.

A show window refers to an outside display window in which a store exhibits merchandise.

Figure 1:
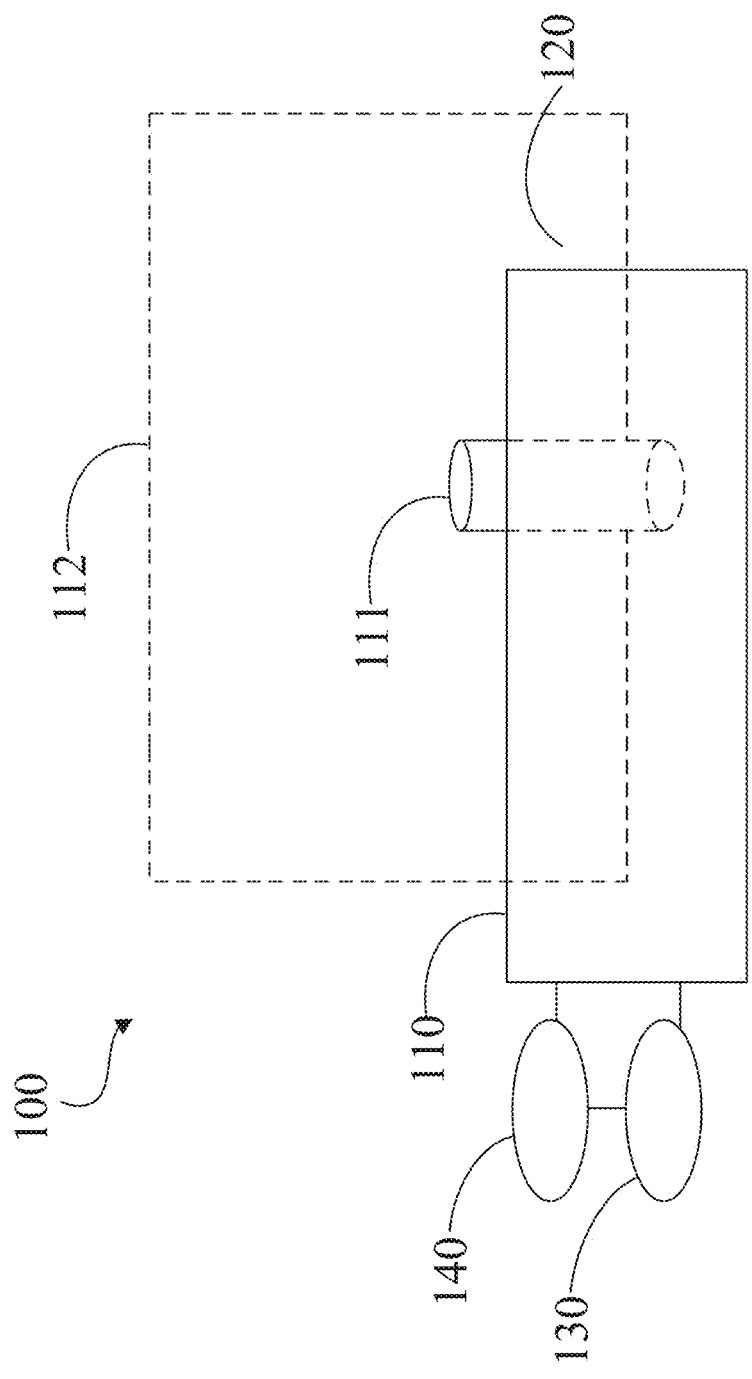
FIG. 1 shows a block diagram of an embodiment of a display system.

FIG. 1 shows a block diagram of an embodiment of a display system 100. The display system 100 includes at least a display panel 110, a display item 111, a background setting 112, a display space 120, a control module 130, and a motion module 140. In other embodiments, display system 100 may not have all of the elements or features listed and/or may have other elements or features instead of, or in addition to, those listed.

Display system 100 provides a system for displaying items and/or performances in a display space in combination with and optionally synchronized with multimedia content that are played on at least one display panel. Throughout this specification, the terms "in combination with," "in accordance with," "in coordination with," and "synchronized with" are used interchangeably, and may be substituted one for the other to obtain different embodiments. In at least one embodiment, display system 100 may be used to exhibit and/or promote products and/or services. In another embodiment, display system 100 may display processes or performances including tours, musical, or performances on a stage. In at least one embodiment, display system 100 includes at least one display panel that may play multimedia content while allowing viewers to see through the display panel to observe items and/or performers in the display space. In at least one embodiment, display system 100 includes a control module that controls at least a motion module for moving the display items or performers in accordance with the multimedia played on the display panel. In at least one embodiment, display system 100 also includes a lighting module for controlling the light effects under the control of the control module. In at least one embodiment, display system 100 further includes a sound module for adjusting the audio effects under the control of the control module.

In at least one embodiment, display system 100 adapts to different environments and/or meets different requirements of different exhibitions and/or performances. Display system 100 may be installed in an open or closed environment, adaptively, and may be modified according to the installation environment and/or display requirements. For example, display system 100 may be installed in an open space such as an open-air stage or a stage in a performance hall. In another example, display system 100 may be installed in an enclosed or limited space such as a showcase, a show window of a retail store, or a vehicle. In at least one embodiment, display system 100 includes one or more boards that define or limit the display space.

Display panel 110 is an electronic panel that plays multimedia content and also allows viewers to see through to observe display items or performers in display system 100. In at least one embodiment, according to display requirements and/or content of the multimedia or video, at least a portion of the display panel 110 turns transparent or semi-transparent, so that viewers can see through the transparent or semi-transparent portion and observe the display items or performers inside the display space. In an embodiment, display panel 110 may include a pair of polarizers sandwiching a birefringent material, whose birefringence changes in response to an application of a voltage or electric current. In at least one embodiment, other portions of display panel 110 display multimedia while turning opaque, thus not allowing viewers to see through display panel 110 at those portions. In other words, the location and/or duration of time of transparency and the playing of multimedia content on the display panel 110 are coordinated with the display item by the display system 100. Throughout this specification, the terms "videos," "multimedia," and "multimedia content" are used interchangeably, and may be substituted one for the other to obtain different embodiments. In one embodiment, the portion of display panel 110 that plays the video is semi-transparent, so that display items behind the display panel 110 is always visible during the video. In another embodiment, a part of display panel 110 that plays the video is opaque, while the other part of display panel 110 is transparent so that viewers may see through and observe the display items while watching the video at the same time. In at least one embodiment, display panel 110 is placed between the viewers and the display items, with one side of display panel 110 facing the viewers while the other side of display panel 110 facing the display items within display space. In at least one embodiment, the side of display panel 110 that faces the viewers is defined as the front side and the viewers are in front of the display panel 110, while the other side of display panel 110 facing the display space is defined as the back side and the display items and display space are behind the display panel 110 on the back side of display panel 110. In at least one embodiment, display panel 110 may play multimedia content on either or both sides of the display panel 110.

In at least one embodiment, display panel 110 is connected to a control module and receives control commands and/or signals from the control module to modulate the transparency and to play multimedia content on the display panel 110. In at least one embodiment, multiple display panels 110 may be joined together to form one large display panel or screen for playing a video as a whole or separately. For example, multiple display panels 110 on the wall of a building may each play a different video, independently from one another. In another embodiment, multiple display panels 110 may form a large screen and play a single video as a whole, with each display panel 110 showing certain portion of the video content.

In at least one embodiment, display panel 110 may be a touch screen for receiving user input or to allow user interaction with the display system 100. Throughout this specification, the terms "viewers," "users," "pedestrians," "customers," and "bystanders" are used interchangeably, and may be substituted one for the other to obtain different embodiments. In at least one embodiment, the display panel 110 or other structures of display system 100 may include input devices include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. In at least one embodiment, display system 100 translates the input information received from users or viewers to control operations of the display system 100 to imitate processes or modify display effects.

In at least one embodiment, display panel 110 may be made from flexible or rigid materials, and/or may be of different shapes and/or sizes according to different display requirements. In at least one embodiment, display panel 110 may be flat, curved, or uneven. For example, display panel 110 may be wave shaped on the surface, and/or may have a circular perimeter. In an embodiment, the structure, size, and/or shape of the display panel 110 may affect the shape and/or size of the display space.

Display item 111 may include at least a product, a device, a human being, an animal, or anything that may be displayed in display system 100. For example, display system 100 may display a pot of flowers, a bottle of wine, a model of an airplane, a model of boat or raft traveling along a river, a human performer, a rabbit, or any combination thereof. In another example, display system 100 may display a process, a musical performance, another type of performance, a puppet show, a tour, and/or a driving experience (for example, the driving experience may include a jeep and/or the driving of a jeep). In at least one embodiment, multiple display items 111 may be displayed in display system 100. In at least one embodiment, display item 111 may be placed in the display space and viewers may or may not see display item 111 through display panel 110 (depending on whether display panel 110 is in the transparent or opaque state of display panel 110). In another embodiment, display item 111 may be stored in a concealed space temporarily until being displayed.

Background setting 112 may be a board, a wall, or any structure behind display panel 110 for defining the display space. In at least one embodiment, background setting 112 in FIG. 1 (and in other figures) helps to define the display space 120, with display item 111 between display panel 110 and background setting 112. Background setting 112 may be a solid shade or color (e.g., background setting 112 may be black, white, blue, and/or red). Additionally or alternatively, background setting 112 may include a background picture or scenery and/or a display panel that displays a video or still image. Background setting 112 is optional.

Display space 120 is an open or closed space where display item 111 is displayed. In at least one embodiment, shows or performances can also be displayed in display space 120. In at least one embodiment, display space 120 is defined by at least one display panel 110 and structures, modules, and/or devices of the display system 100. In at least one embodiment, display system 100 adapts to the environment where the display system 100 is installed, the device and structure of which environment together with the display system 100 defines the display space 120.

In at least one embodiment, display space 120 may be defined by a plurality of boards (e.g., boards on the side, at the top, and/or on the bottom of display system) that form a closed space. In other words, the display boards may be located on the perimeter of display space 120, thereby defining all or some of the borders of display space 120. In another embodiment, display space 120 may be limited and/or defined by one or more other structures of the environment where the display system 100 is installed, such as walls, pillars, floor, and/or ceiling, which are external to the display system 100. In another embodiment, a lighting module of the display system 100 may be installed in a position that is lower than the display item 111 or close to the bottom of display system 100 to limit the display space 120. In at least one embodiment, display system 100 can be adjusted to meet different environmental requirements, thus display space 120 may be defined accordingly.

In an embodiment, display panel 110 includes a window of a retail store, and display space 120 is defined by the display panel 110, the walls to the left and/or right of the show window, ceiling and/or floor adjacent to, and/or connected to, the display panel 110, and/or rear wall of the show window. In at least one embodiment, display panel 110 plays video facing outward of the show windows (e.g., facing pedestrians on the streets) and/or facing inward of the show windows (e.g., facing customers inside the retail store). In one embodiment, display panel 110 may replace the glass of show window of a retail store facing a side-walk for playing videos and/or advertisements to the pedestrians. Different items may be displayed in the display space 120, while viewers may see the items and watch the video on the show window from outside of the retail store (e.g., from the side-walk). In another embodiment, the display panel 110 on the show window may play videos facing inward while the rear wall of the show window is transparent, so that viewers inside the retail store may also see the display item 111 and watch the video on the show window.

In another embodiment, one or more display panels 110 form the exterior walls of a building, which display panels 110 face outward and/or inward. In at least one embodiment, display space 120 may be defined by the exterior wall, the connecting walls, pillars, ceiling, and/or floors of a building. In one embodiment, in which display panels 110 display video facing outward, display space 120 is inside the building, and viewers or pedestrians outside the building can see through the display panels 110 and/or videos played on the display panels 110. In at least one embodiment, the display panels 110 are on the walls of a building and act as bill boards—when a portion of the display panel 110 becomes transparent, pedestrians can see into the building through the transparent portion of the display panel 110. In another embodiment, display panel 110 displays videos facing inward with respect to the building, so that viewers inside the building can watch videos displayed on display panel 110, and/or see through the display panel 110 to get a view outside the building (e.g., display space is outside the building and display items 111 and/or performances are outside the building) according to the requirements and/or programs of the display.

In yet another embodiment, display system 100 is installed in a vehicle (e.g., car, bus, train, and/or plane), with at least one display panel 110 installed as a window of the vehicle. In at least one embodiment, display space 120 is defined by the window that has the display panel 110, frames, and/or doors of the vehicle. In at least one embodiment, the display panel 110 on the window of the vehicle may display video facing outward and/or inward. In at least one embodiment, display panels 110 replace glass of windows in the vehicle. In one embodiment, display space 120 is the space inside the body of the vehicle, while viewers outside the vehicle may observe items and/or people that are inside the vehicle and/or multimedia displayed on the windows. In another embodiment of display panels 110 in which the windows of the vehicle face inward, display space 120 is outside the vehicle and viewers that are inside the vehicle may see through the window and/or watch the multimedia displayed on the windows.

In at least one embodiment, display space 120 is large enough to display performances by human performers or artists. For example, in an embodiment of display space 120 that is not limited by boards (e.g., the display space 120 is not in a box or other enclosure), the display space 120 may be defined by the floor or rear wall of the environment (e.g., in a building or on a stage), along with the display system 100 that is installed on the floor and/or by the wall. In at least one embodiment, display space 120 displays items or products of different sizes, shapes, and/or numbers.

Control module 130 is a module that is configured to control the multimedia content played on the display panel 110 and coordinate the display of items and/or performances in accordance with the multimedia content and/or requirements of the exhibition and/or performances. In at least one embodiment, control module 130 is connected to display panel 110 via wired or wireless connections for controlling the multimedia content that are played on the display panel 110 and/or the transparency of at least a portion of the display panel 110. In at least one embodiment, control module 130 also controls the display process and/or effects, such as the movements of display item 111, the light effects and/or the audio effects, in accordance with the multimedia played on the display panel 110. In at least one embodiment, control module 130 is connected to a motion module for controlling the movements of display item 111. In at least one embodiment, control module 130 is connected to a lighting module for controlling the light effects during the display of display item 111. In yet another embodiment, control module 130 is connected to a sound module for controlling audio media and/or adjusting the volume.

In this specification, the term "module" is to be understood as being generic to software, hardware modules, and combinations of software and hardware modules. In at least one embodiment, control module 130 includes hardware, such as signal generators, transmitters, and/or receivers for communicating and transmitting signals. In another embodiment, control module 130 may include memory and processor systems. Optionally, control module 130 may include sensors or input devices for receiving user input. Optionally, control module 130 may include a microphone, and/or an antenna. Control module 130 may include algorithms for sending and/or receiving data.

In at least one embodiment, control module 130 includes one or more interfaces to communicate with one or more display panels 110. In at least one embodiment, control module 130 sends control commands to display panels 110 for controlling the multimedia content played on the display panels 110. In at least one embodiment, control module 130 controls selections of multimedia content for playing on each of or certain display panels 110, volume of sound from sound module, brightness and contrast of display panels 110, and play speed. In at least one embodiment, control module 130 includes interfaces and/or connecting ports to communicate with other modules of the display system 100 (e.g., motion modules, lighting modules, and/or sound modules). In at least one embodiment, control module 130 transmits control commands to the motion module to move display item 111 and/or to transport performers during an exhibition or performance. For example, the motion module may include structures such as a platform or a turntable to transport performers who stand on the platform or turntable, when the platform moves or when the turntable rotates. Control module 130 may also control the display of multimedia content on the display panel 110. In at least one embodiment, control module 130 coordinates the movements of display item 111 and the playing of multimedia on the display panel 110 to enhance attractiveness of the display. For example, when the video played on the display panel 110 includes a description (e.g., in images and/or sentences) of the display item 111, the control module 130 may move and/or manipulate the display item 111 in a manner coordinated with different images and/or sentences on the display panel 110. In at least one embodiment, the combination of the display of display item 111 and multimedia on the display panel 110 creates a greater visual impact enhancing the presentation of the display item 111 and/or performances. As a result, the display is more attractive to viewers and/or bystanders so that viewers are more likely to pay more attention to the display of the items and/or performances. In at least one embodiment, viewers get a better view in front of the display panel 110. In other embodiments, viewers can view the display system 100 from different positions and/or angles.

In at least one embodiment, control module 130 includes a memory system that stores instructions, settings, and/or programs for displaying different items and/or performances, and/or in different environments. In another embodiment, control module 130 receives control commands from external devices or systems. In at least one embodiment, control module 130 includes at least a digital interface that receives data from wired or wireless signals transmitted from devices external to display system 100. In at least one embodiment, the communication between modules of display system 100 and/or between display system 100 and external devices may include, but are not limited to, WIFI communication, near field communication, Bluetooth communication, facsimile, audio communication, radio communication, infrared communication, and/or communications via networks such as the Internet. In at least one embodiment, external devices may include intelligent devices. In at least one embodiment, the external devices include computers that have digital interfaces. In at least one embodiment, the external devices include data transmitting devices, and/or the external devices that have connections to the internet and/or other networks. In at least one embodiment, the intelligent devices also include mobile devices, such as mobile phones or mobile remote controls. In at least one embodiment, the intelligent devices may include a smart card that is installed with radio-frequency identification (RFID) or other form of near field communications. In at least one embodiment, control module 130 includes a Universal Serial Bus (USB) port for reading control commands that are stored in USB storage devices. In at least one embodiment, the signals received from external control devices include control programs for display system 100. In at least one embodiment, the control programs for controlling display system 100 may be stored in mobile devices, or servers. In another embodiment, display system 100 uses programs on web browsers that send control commands directly to the motion module, lighting module, and/or sound module, while the control module may not be necessary. In at least one embodiment, control programs include software that communicates with control module 130, via a communication protocol, program call, script, library call, web service, software service, remote procedure call, and/or socket interface.

In at least one embodiment, control module 130 includes sensors for receiving external signals that may be converted into control commands. In at least one embodiment, the sensors are installed on the display system 100, and/or on external devices (e.g., a signal transmission device) that sends control commands to display system 100. In at least one embodiment, control module 130 may receive control signals directly from the sensors, or from the signal transmission device that receives signals from the sensors. In at least one embodiment, the sensors include, but are not limited to, heat sensors, motion sensors, light sensors, tilt sensors, and pressure sensors. In at least one embodiment, based on strength, frequency, and/or duration of the signals generated from the sensors, control module 130 sends control commands to other modules of display system 100, and/or selects videos to play on the display panel 110. In at least one embodiment, control module 130 includes an external control device that receives signals from one or more sensors and sends control commands to control module 130. In at least one embodiment, control programs on external devices may also include a sensor control device that receives signals from one or more sensors and send signals and/or control commands to multiple display systems 100.

In at least one embodiment, control module 130 receives control commands from external sources and/or converts data received into control commands, and in turn sends the control commands to other modules of display system 100. Throughout this specification, the terms "signals," "data," and "information" are used interchangeably, and may be substituted one for the other to obtain different embodiments. For example, control commands are sent to motion module to control one or more motors, or to control the direction, speed and/or duration of movements of devices for moving display item 111. In another embodiment, control commands also cause the motion module to open and/or close gates and/or doors between display space 120 and concealed space. In another embodiment, control module 130 sends control commands to lighting module to turn on and off lighting devices and/or adjust light effects, such as brightness, colors, and/or fade-in and fade-out effects.

In at least one embodiment, control module 130 may control multiple display panels 110 of display system 100, each of which may play the same video content. In another embodiment, each or some of the display panels 110 may be separately controlled by control module 130 and may play different video content. In at least one embodiment of multiple display panels 110 being joined to form a large display panel, the multiple display panels as a whole may display one single video under the control of control module 130. In at least one embodiment, more than one display systems 100 are in operation simultaneously under the control of multiple control modules 130, which may receive external control commands via digital interfaces from a same control program in order to create one synchronized exhibition or performance. In at least one embodiment, the external control program that controls multiple display systems 100 can be executed by one single intelligent device (e.g., one single computer, remote control device, and/or other devices) or a group of intelligent devices. Multiple display systems 100 can display one or more display items 111 simultaneously or in certain order. In an embodiment of display system 100 having multiple sound modules, control module 130 controls and/or coordinates audio content that are played, via different sound modules.

Motion module 140 is a module that is configured to move display item 111 and/or performers according to different exhibition or performance requirements. In at least one embodiment, motion module 140 moves, spins, raises, lowers, and/or transfers display item 111 in display space 120 or between display space and concealed space of display system 100. In at least one embodiment, motion module 40 is connected to and receives control commands from control module 130, and moves display item 111 and/or performers in accordance with the multimedia displayed on display panel 110.

In at least one embodiment, motion module 140 includes one or more motors, gears, pulley systems, and/or assemblies of gears that may interact with one another to move display item 111 and/or performers. In at least one embodiment, upon receiving control commands from control module 130, motion module 140 may control at least a motor to rotate forwards or backwards, which further rotates and/or moves, for example, a turntable, an elevation platform, devices on a track, and/or different pulley systems and gears.

In at least one embodiment, motion module 140 includes non-mechanical and/or non-contact devices, such as levitation devices that utilize electromagnetic field or wind control method to move display item 111 and/or performers inside the display space 120, and/or between display space 120 and concealed space. In at least one embodiment, magnetic forces or wind forces may be used to counteract the effects of the gravitation and any other accelerations, thus may suspend and/or move items.

In at least one embodiment, motion module 140 moves display item 111 from one position to another position within display space 120. For example, motion module 140 moves display item 111 from the front left corner of display space 120 toward the rear right side, while the concept of front, rear, left and right within display space 120 are relative to a certain perspective of a viewer. In another embodiment, motion module 140 moves display item 111 from the bottom of display space 120 up towards the top of display space 120. In at least one embodiment, motion module 140 moves items or performers between display space 120 and concealed space. In at least one embodiment, motion module 140 may move display item 111 in different paths, such as in a straight line or curved line. In another embodiment, motion module may rotate display item 111 about certain axles. For example, motion module 140 may imitate the movement of a model of a jet fighter taking off from a runway. In another embodiment, motion module 140 moves display item 111 such as a bottle of wine, to imitate the action of pouring wine out of the bottle into a glass.

In at least one embodiment, motion module 140 moves more than one display product 111 simultaneously or one after another within display space 120. In at least one embodiment, motion module 140 may include, but is not limited to, one or more turntables, elevation platforms, tracks, movable vehicles, hooks, ropes, clamps installed on turntables, and/or platforms on tracks. In at least one embodiment, motion module 140 may further include pulleys, pulley assemblies, and/or drag chains, which can pull or hang display item 111. In at least one embodiment, devices and/or assemblies of motion module 140 are installed on the top or bottom of the display space 120, behind the display panel 110. In another embodiment, devices and/or assemblies of motion module 140 may be installed adjacent to the sides of display system 100, or outside the display space 120. For example, when display system 100 is installed in an open environment without a top board, motion module 140 may be installed on the ceiling above the display space 120. In at least one embodiment, motion module 140 enhances the display effect of exhibition or performance by moving display item 111 and/or performers using different combinations of devices. In at least one embodiment, motion module 140 enables a display of items or performances in different angles and aspects, which improves the overall impact created by the display system 100.

In at least one embodiment, display system 100 also includes a sound module that includes software and hardware for playing audio media content. In at least one embodiment, sound module is connected to and receives commands from the control module 130 for controlling the audio media played during exhibition and/or performances. For example, sound module may adjust the volume of the audio media.

Figure 2:
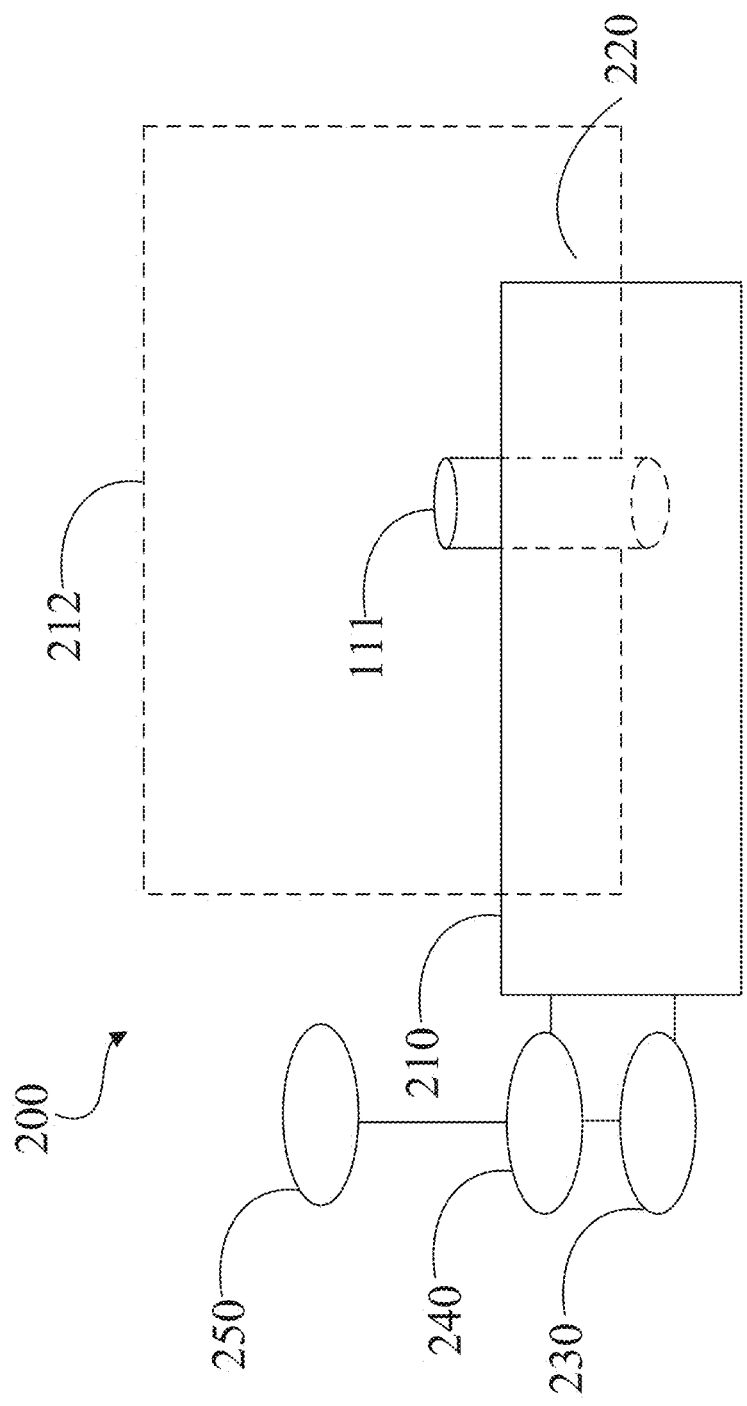
FIG. 2 shows a block diagram of another embodiment of the display system of FIG. 1.

FIG. 2 shows a block diagram of another embodiment of the display system 100 of FIG. 1. Display system 200 includes at least display item 111, a display panel 210, a display space 220, a control module 230, a motion module 240, and a lighting module 250. In other embodiments, display system 200 may not have all of the elements or features listed and/or may have other elements or features instead of, or in addition to, those listed.

FIG. 2 shows another embodiment of display system 100 further including a lighting module. Display panel 210, display space 220, control module 230, and motion module 240 may be embodiments of display panel 110, display space 120, control module 130, and motion module 140, respectively, which were discussed in conjunction with FIG. 1.

Lighting module 250 is a module that is configured to control the light effects during display of exhibition or performance by display system 200. In at least one embodiment, lighting module 250 controls on and off of lighting devices, and/or adjusts brightness, color, and/or angles of the beam of light in display system 200. In at least one embodiment, lighting module 250 include one or more light bulbs and/or spot lights. In at least one embodiment, lighting module 250 may focus the light on the display item 111 or other places to attract the attention of the viewers. In at least one embodiment, lighting module 250 is connected to the control module 230 and receives control commands from control module 230 to control and/or adjust the light effects to adapt to different requirements or environment. In at least one embodiment, different display items 111 may require different colors of light that may be in different angles and/or brightness. Based on different requirements, control module 230 makes adjustments by sending different control commands to the lighting module 250. In at least one embodiment, lighting module 250 enhances the visual impact of the exhibition and/or performances by adjusting and coordinating the light effects with the display of display item 111 in display system 200.

In at least one embodiment, lighting module 250 limits the size and/or location of display space 220. For example, a display panel may be set up in a football field or between the field and the stand on one side of the stadium. At night when spot lights of the lighting module 250 only provides illumination to an area within 30 feet from the display panel 210, the space beyond 30 feet is too dark for people to see anything therein. Therefore, display space 220 is limited by lighting module 250 to a depth (distance from the display panel 210 to the far end of the illumined area) of about 30 feet. In one embodiment, display space 220 may be defined by the space illumined by the lighting module 250 alone in a completely dark environment, as the viewers cannot see anything in the area that is not illumined by the lighting module 250. In such embodiment, space outside the illumined space is not considered as part of the display space 220. In at least one embodiment, the space not illumined by lighting module 250 may be considered as a concealed space.

In at least one embodiment, unlike current display systems with limitations on the position of display item and the video played on display panel, display system 200 enhances display effects by moving display item 111 via motion module 240 and/or adjusting light effects via lighting module 250, both of which are coordinated with the multimedia content on the display panel 210 to enhance the audio and visual effects. In at least one embodiment, the display item 111 and/or performers are not confined in a specific location within display space 220, as a result of the motion module 240 and/or lighting module 250.

Figure 3:
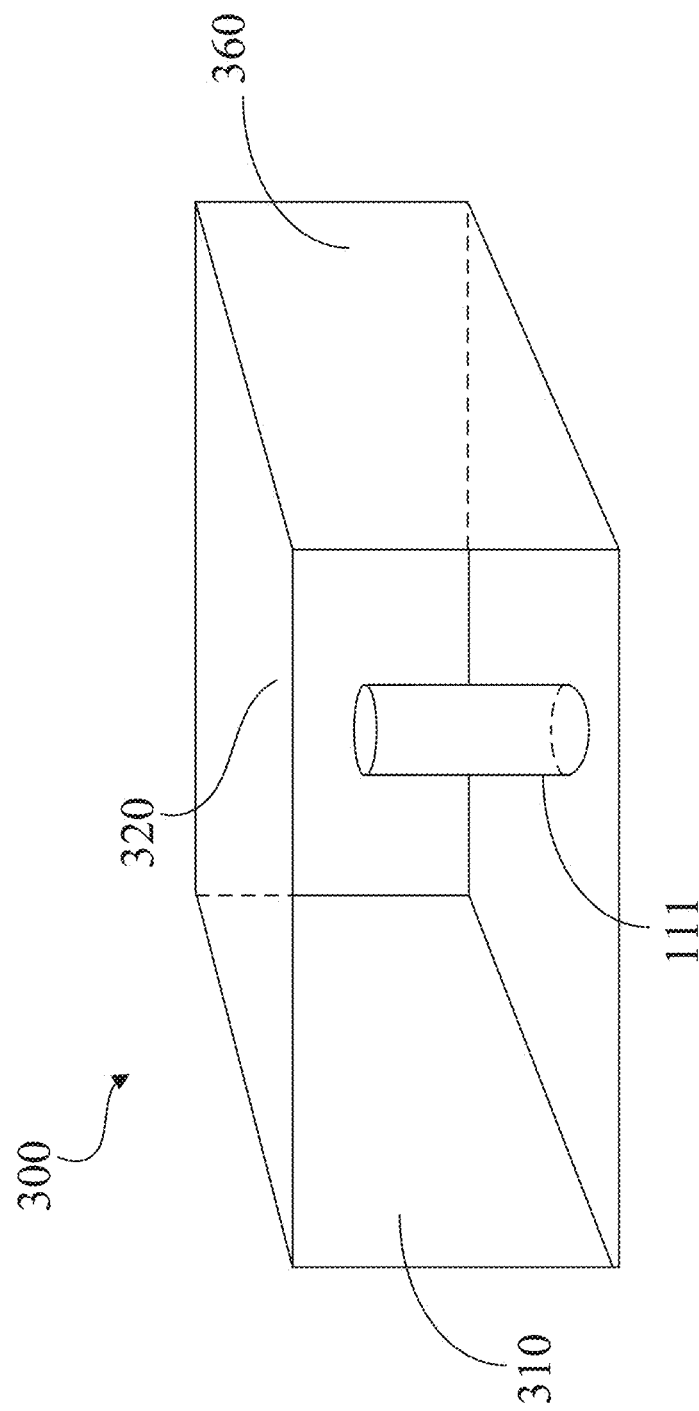
FIG. 3 shows a block diagram of an embodiment of a display system including boards.

FIG. 3 shows a block diagram of an embodiment of display system 300 including boards. Display system 300 includes at least display item 111, a display panel 310, and a display space 320. Display system 300 further includes a plurality of boards 360. In other embodiments, display system 300 may not have all of the elements or features listed and/or may have other elements or features instead of, or in addition to, those listed.

FIG. 3 shows that one display panel 310, together with five boards, forms a cubic or rectangular enclosure or showcase that defines the display space 320. Display panel 310 and display space 320 may be embodiments of display panel 110 and display space 120, respectively, which were discussed in conjunction with FIG. 1. In at least one embodiment, display space 320 may be defined by at least one display panel 310 and one or more boards located on the top, bottom, and/or sides of display space 320 (except for the side having the display panel 310). In another embodiment, display space 320 is defined by at least one display panel 310, at least one board of the display system 300, and/or a space that is illumined by lighting module 250 that may be installed in display system 300.

Boards 360 include boards that may be located on the top, at the bottom, and/or on the sides of display system 300 for defining display space 320. In at least one embodiment, boards 360 may have different sizes and/or shapes. In at least one embodiment, one or more of boards 360 may be made from flexible or rigid materials, in order to adapt to different environment or meet various requirements of display and/or installation. In at least one embodiment, one or more of boards 360 may be made from transparent materials such as glass or transparent plastic sheets, or can be made from opaque materials such as plastic sheets or glass tinted with non-transparent paint, metal, or wood plates. In at least one embodiment, two or more of the boards 360 may be joined together, or may have a gap in-between. For example, when a display panel 310 replaces a store window of a retail store, no board at the rear side of display space 320 is needed. In another example, display panel 320 and multiple boards 360 form a space with polygon shaped cross-section, while the edges of the polygon are not connected to one another. In at least one embodiment, display system 300 may include other numbers and/or shapes of boards 360 to form an enclosure (e.g., a box) that may be cubic or have a cross section of triangular, hexagonal, or circular shape.

In at least one embodiment, at least one board on one side of display system 300 is transparent and there is enough illumination behind the transparent board, so that viewers may see through the display panel 310 and the transparent side board and view an item behind the transparent side board. In the embodiment of display system 300 having one transparent side board, space behind the transparent side board is part of the display space 320 and an item for display may be placed behind the transparent side board.

Figure 4A:
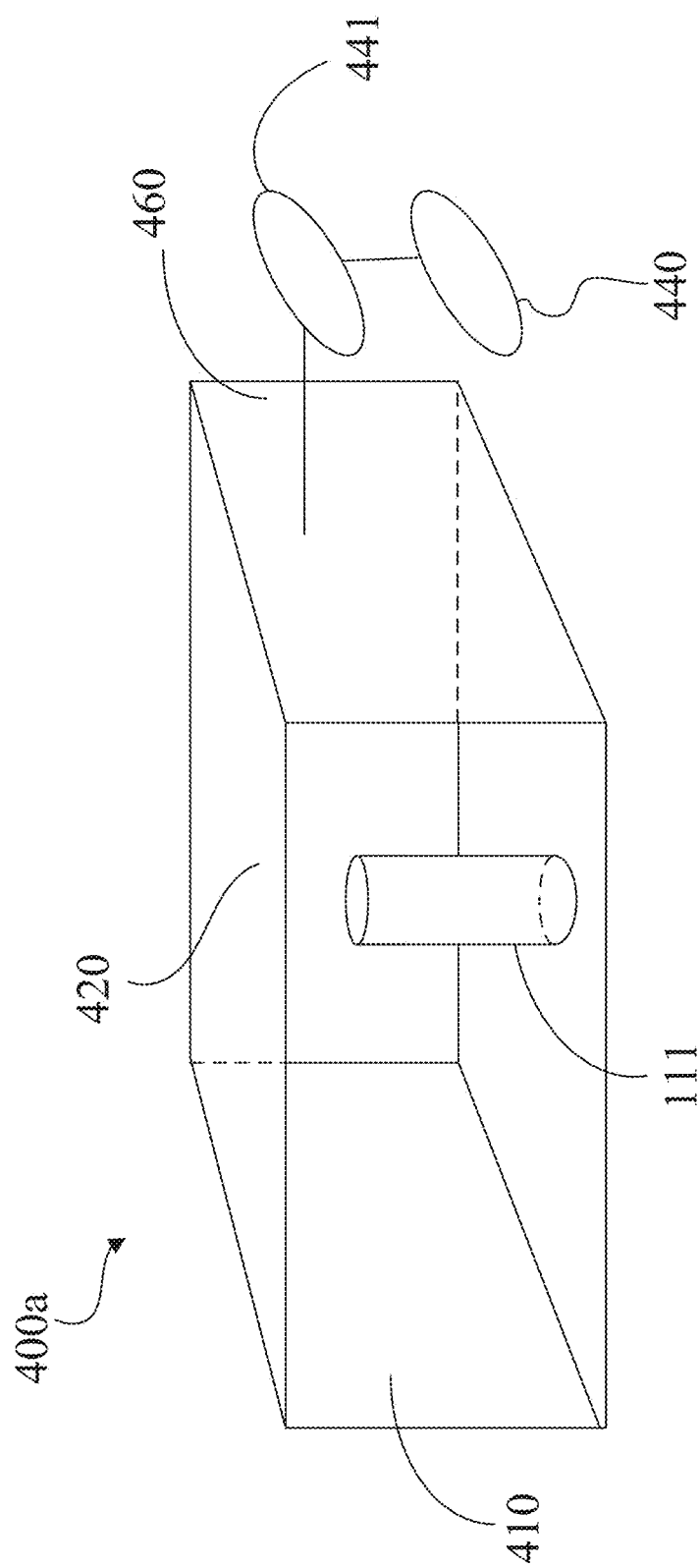
FIG. 4A shows a block diagram of another embodiment of the display system of FIG. 3 including a motion module and other devices.

FIG. 4A shows a block diagram of another embodiment of display system 300 of FIG. 3 including motion module and devices. Display system 400a includes at least display item 111, a display panel 410, a display space 420, a motion module 440, and a transmission device 441. In other embodiments, display system 400a may not have all of the elements or features listed and/or may have other elements or features instead of, or in addition to, those listed.

FIG. 4A shows another embodiment of display system 300 further including a motion module and a transmission device for moving display item 111 and/or performers during display. Display panel 410, display space 420, and motion module 440 may be embodiments of display panel 110, display space 120, and motion module 140, respectively, which were discussed in conjunction with FIG. 1.

Transmission device 441 includes devices and/or systems that may be driven by motors for moving display item 111 and/or performers within display space 420. In at least one embodiment, transmission device 441 is under the control of motion module 440. In at least one embodiment, according to the requirements of the exhibitions or performances, transmission device 441 moves display item 111 and/or performers in coordination with the multimedia played on display panel 410. In at least one embodiment, transmission device 441 moves display item 111 in different movement paths. For example, in display of a model of an airplane, transmission device 441 moves the airplane model in paths that imitate the taking off and/or landing processes in the display space 420. In another example, to display a model of a boat rafting on virtual rapids, transmission device 441 includes multiple devices in different locations to imitate the movements and paths of the boat model rafting along the river. In at least one embodiment, transmission device 441 is installed in certain places in display system 400a that is not visible to viewers (e.g., in concealed spaces or outside display system 400a). Alternatively, transmission device 441 may be installed in places that are visible to viewers, in order to meet different exhibition or performance requirements.

In at least one embodiment, transmission device 441 includes devices that were discussed in conjunction with motion module 140 of FIG. 1. Examples of transmission devices 441 will be discussed in details in FIGS. 5, 6, and 7A-D.

Figure 4B:
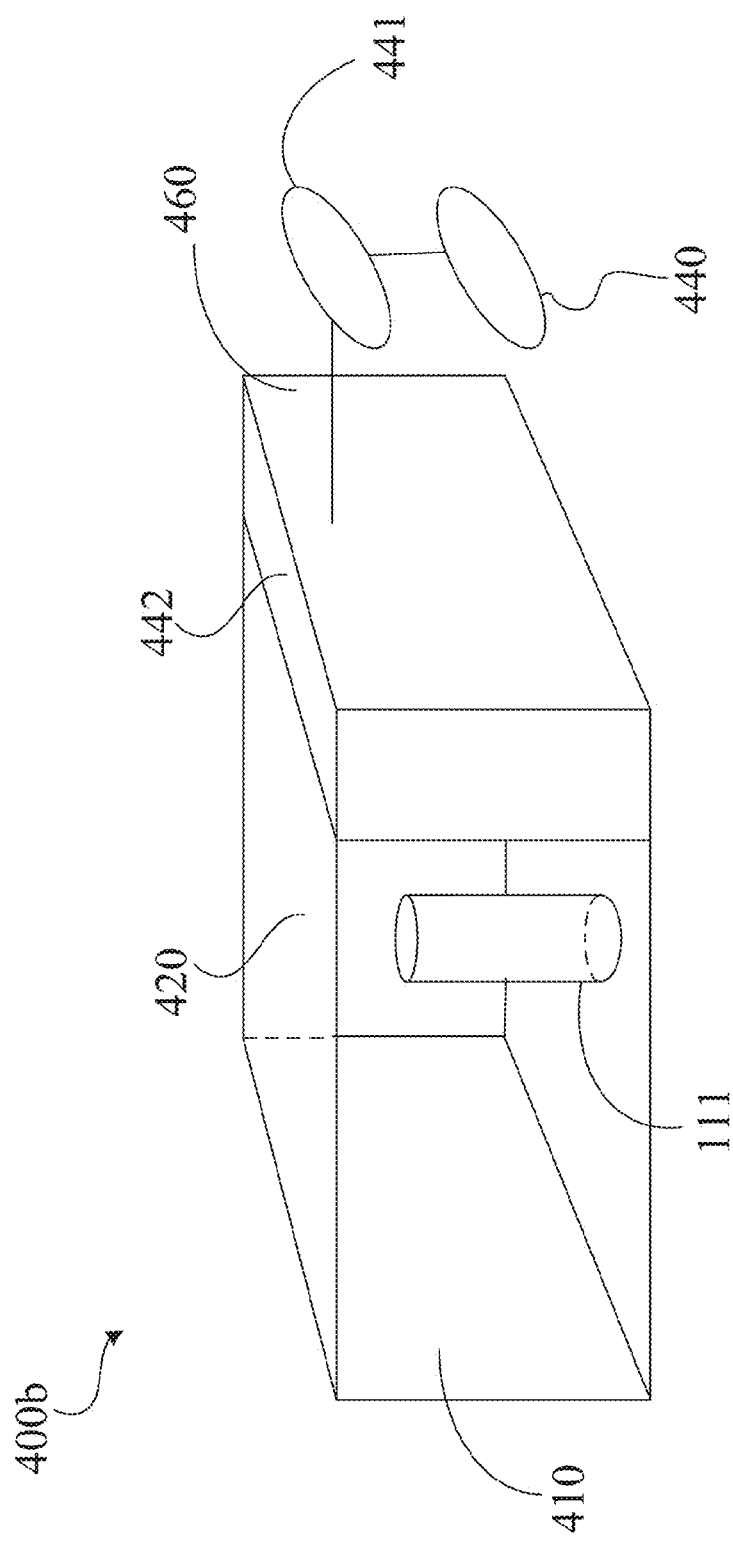
FIG. 4B shows a block diagram of an alternative embodiment of the display system of FIG. 4A further including a concealed space.

FIG. 4B shows a block diagram of an alternative embodiment of display system 400a of FIG. 4A including a concealed space. Display system 400b includes at least display item 111, display panel 410, display space 420, motion module 440, and transmission device 441. Display system 400b may also include concealed space 442. In other embodiments, display system 400b may not have all of the elements or features listed and/or may have other elements or features instead of, or in addition to, those listed.

FIG. 4B shows an alternative embodiment of display system 400a further having a concealed space by the side of display space 420. In at least one embodiment, display system 400b may have other numbers of concealed spaces of other shapes and/or sizes, and/or in other locations.

Concealed space 442 is a space in display system 400b for temporarily or permanently storing or hiding items, performers, and/or devices from viewers. In at least one embodiment, concealed space 442 includes a hollow space within an enclosure or other structures. In at least one embodiment, concealed space 442 includes opaque boards surrounding the concealed space 442 so that viewers cannot see into concealed space 442. In another embodiment, concealed space 442 may include a space that is not illumined by lighting module that may be installed in display system 400b, thus viewers are not able to see items and/or devices that are in the dark. In at least one embodiment, one or more concealed spaces 442 may be installed on top of, at the bottom of, and/or on the sides of display space 420 to meet different requirements of exhibition or performance. In another embodiment, a portion of or an entirety of concealed space 442 may be installed outside the display system 400b.

In at least one embodiment, display system 400b includes concealed space 442 that stores display item 111 when display item 111 is not currently required for exhibition or performance. In another embodiment, concealed space 442 hides performers or artists who are not currently required for performance. In at least one embodiment, transmission device 441 transfers display item 111 and/or performers between display space 420 and concealed space 442. In at least one embodiment, concealed space 442 includes at least a movable door or gate, which allows display item 111 and/or performers to be moved between display space 420 and concealed space 442. In at least one embodiment, motion module 440 controls the open and close of the door and the movement of display item 111 from display space 420 to concealed space 442, or from concealed space 442 to display space 420.

In at least one embodiment, multiple display items 111, separately or in combination, can be exhibited using display system 400b. In one embodiment, no display item 111 is in the display space 420 at a specific time thus all items are hidden in concealed space 442. In another embodiment, one or more display items 111 are displayed in the display space 420.

Figure 5:
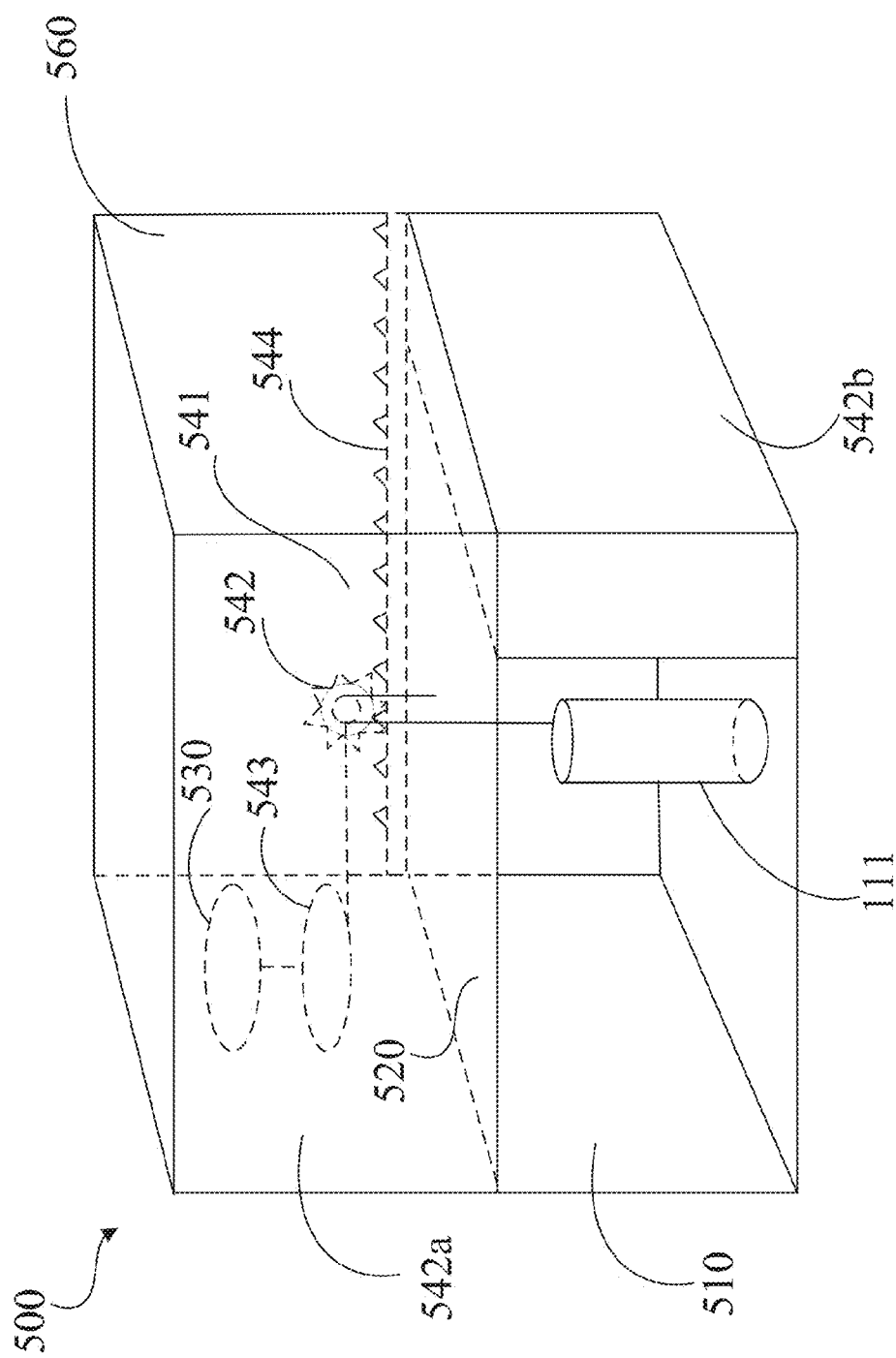
FIG. 5 shows a block diagram of an embodiment of a display system including a pulley system.

FIG. 5 shows a block diagram of an embodiment of display system 500 including a pulley system. Display system 500 includes at least display item 111, a display panel 510, a display space 520, a control module 530, a transmission device 541, concealed spaces 542a and 542b, a pulley system 512, a first motor 513, and a track 514. In other embodiments, display system 500 may not have all of the elements or features listed and/or may have other elements or features instead of, or in addition to, those listed.

FIG. 5 shows an embodiment of display system 500 having mechanical devices for moving display item 111 (e.g., a pulley system together with gears, track, and/or other devices). Display panel 510, display space 520, and control module 530 may be embodiments of display panel 110, display space 120, and control module 130, respectively, which were discussed in conjunction with FIG. 1. Transmission device 541 and concealed space 542a and 542b may be embodiments of transmission device 441 and concealed space 442, respectively, which were discussed in conjunction with FIGS. 4A and 4B.

Pulley system 512 includes at least one pulley device that is adaptively placed on and/or moves along a track for moving display item 111 in display space 520 or between display space 520 and concealed space. In at least one embodiment, a rope winds around the pulley device and at the other end is tied to display item 111. In at least one embodiment, pulley system 512 is installed on the top of display space 520 or to the ceiling of the environment where display system 500 is installed. In at least one embodiment, pulley system 512 includes at least a toothed wheel that engages with cogged rail or track when moving on the track, which track defines and/or limits the paths of movements of the pulley system 512. In at least one embodiment, a first motor drives the pulley system 512.

In at least one embodiment, pulley system 512 includes ropes, chains, and/or strings for hanging display item 111 while moving display item 111. Throughout this specification, the terms "rope," "chain," and "string" are used interchangeably, and may be substituted one for the other to obtain different embodiments. In at least one embodiment, the rope of the pulley system 512 is connected to a hook for hanging display item 111 below the pulley system 512, or is directly tied to the display item 111. In at least one embodiment, a reel may be installed as part of the pulley system 512, around which the rope winds and hangs the display item 111 on the other end. While the reel rotates, the display item 111 is pulled up or down depending on the direction of rotation of the reel. In at least one embodiment, pulley system 512 and/or the reel are driven by at least a motor. As a result of the pulley system 512 moving along the track and the display item 111 hanging on the reel, the display item 111 may move in paths limited by the track in either direction and may move upward or downward. For example, to move the display item 111 out of sight of the viewers, pulley system 512 of transmission device 541 may pull up the display item 111 until display item 111 is hidden in concealed space 542a that is on top of display space 520. In another example, pulley system 512 may move display item 111 sideward to hide the display item 111 in concealed space 542b that is on one side of display space 520. Optionally, display item 111 may be hidden in concealed spaces at the bottom or on the other side of the display space 520.

In at least one embodiment, more than one pulley system 512 are installed on the track or multiple tracks for moving more than one display item 111. For example, two pulley systems are installed on the track that extends to both sides of the display space 520. The pulley system on the left moves to the left end of the track, carrying one display item exiting from the left side of display space 520, while the pulley system on the right moves to the right end of the track, carrying another display item existing from the right side of display space 520. In one embodiment, display items exiting display space 520 may be hidden in concealed spaces.

First motor 513 is an electric motor in display system 500 for driving the pulley system 512 when electricity is provided. In at least one embodiment, first motor 513 may include servo motors, DC motors, and/or stepper motors. In at least one embodiment, the first motor 513 may engage directly with mechanics or pulley systems, or may drive the mechanics or pulley systems via gears and/or gearing systems. In at least one embodiment, first motor 513 receives control commands from control module 530 and rotates the wheel of pulley system 512 (to move the pulley system 512 along the track in either direction) and/or the reel of the pulley system 512 (to move display item 111 upward or downward). The first motor 513 may be used in any other embodiment of this specification. In this specification, whenever a first device is described, it should be understood that the first device may be used in another embodiment of the specification that includes a second, a third, a fourth, and/or a fifth device. In this specification, any of the devices and/or modules discussed in one embodiment may be substituted for, or added in addition to, any devices and/or modules in another embodiment. Some or all of the devices and/or modules mentioned in the embodiments of the specification may be one and the same device and/or module. For example, some or all of the control modules/controllers mentioned in this specification may be one and the same control module. Any of the modules and/or devices mentioned in any one embodiment may be used in another embodiment of this specification to obtain a different embodiment.

Track 514 is a track that is installed on top of the display space 520 for guiding the movement of the pulley system 512 or other devices. In at least one embodiment, track 514 includes cogs for engage at least a toothed wheel of the pulley device so that the pulley device moves on the track when the toothed wheel rotates. In at least one embodiment, one or more pulley systems 512 are installed on the track 514 for moving one or more display items 111 and/or performers. In at least one embodiment, track 514 may be in a straight line, curved line, or in other line shapes. In other embodiments, more than one track 514 is installed in display system 500 for guiding more than one pulley system and/or device.

Figure 6:
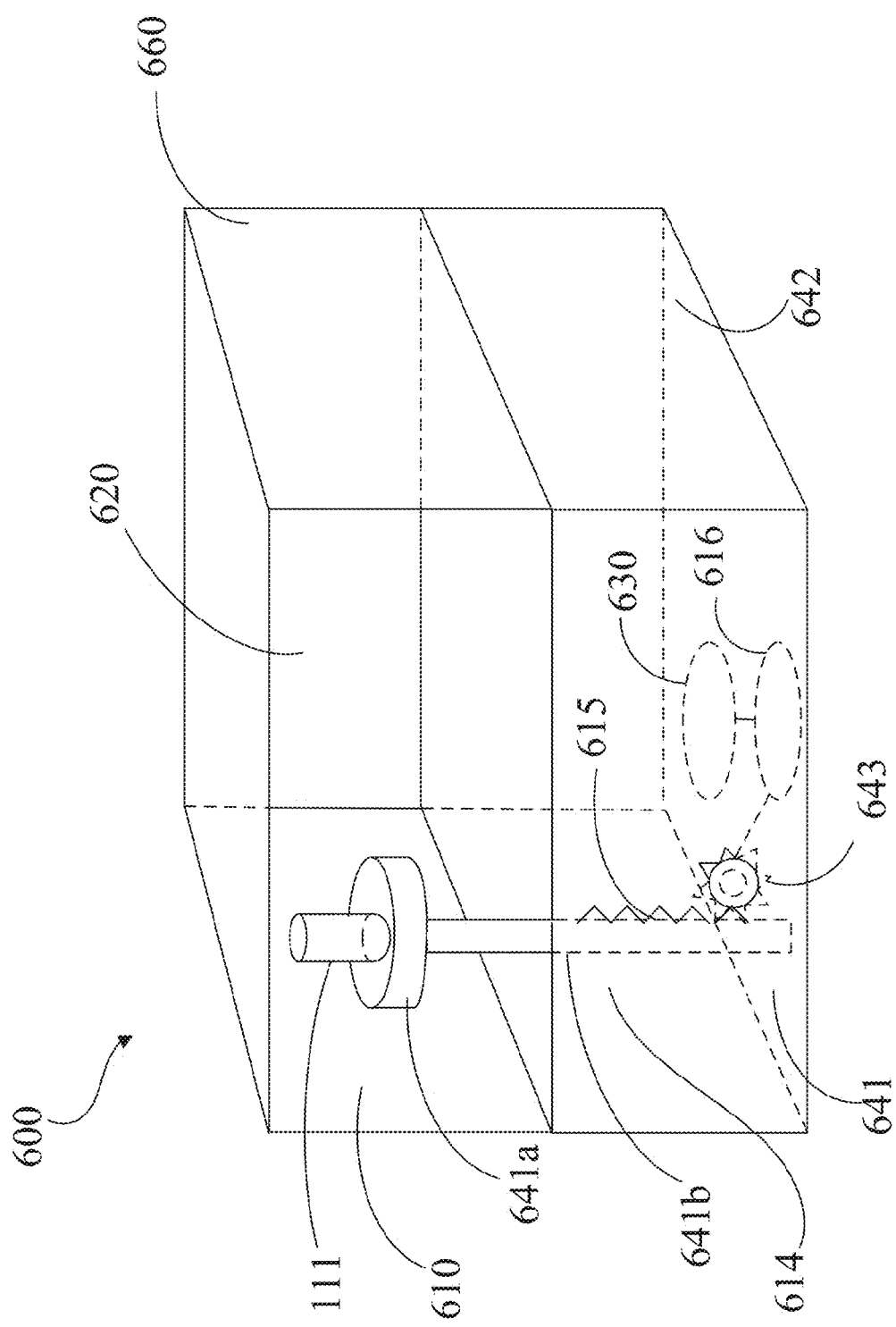
FIG. 6 shows a block diagram of an embodiment of a display system including an elevation system.

FIG. 6 shows a block diagram of an embodiment of display system 600 including an elevation system. Display system 600 includes at least display item 111, a display panel 610, a display space 620, a control module 630, a transmission device 641, a concealed space 642, an elevation device 614 that includes platform 641a and pillar 641b, a gear 643, a rack 615, and a second motor 616. In other embodiments, display system 600 may not have all of the elements or features listed and/or may have other elements or features instead of, or in addition to, those listed.

FIG. 6 shows that display system 600 includes an elevation device at the bottom of or below display system 600 for moving display item 111 vertically. In at least one embodiment, elevation device includes a platform on top of a pillar, on which display item 111 is placed and may be moved upward or downward as a result of the elevation device being raised up or lowered down by a motor. Display panel 610, display space 620, and control module 630 may be embodiments of display panel 110, display space 120, and control module 130, respectively, which were discussed in conjunction with FIG. 1. Transmission device 641 and concealed space 642 may be embodiments of transmission device 441 and concealed space 442, respectively, which were discussed in conjunction with FIGS. 4A and 4B.

Elevation device 614 includes a platform installed on top of a pillar for moving display item 111 and/or performers upward or downward. In at least one embodiment, elevation device 614 includes devices and gears that may be driven by a motor to move the platform of elevation device 614 vertically and thus moves the display item 111 that is placed on top of the platform.

Rack 615 is a rack that is installed vertically along the pillar of the elevation device 614. In at least one embodiment, rack 615 is a cogged or toothed bar or rail, which engages a toothed wheel or pinion that moves the rack 615 and elevation device 614 vertically when the wheel rotates.

Second motor 616 is similar to the first motor 513. Second motor 616 drives the gear that engages cogs of the rack 615 on the elevation device 614 in order to move the platform upward or downward. In at least one embodiment, second motor 616 is connected to control module 630 and drives the elevation device 614 according to control commands received from control module 630.

Platform 641a is a platform installed on the pillar of elevation device 614, on which the display item 111 and/or performers are displayed.

Pillar 641b is a pillar that supports the platform 641a. In at least one embodiment, rack 615 is installed along the pillar 641b so that the gear may move the rack 615 and pillar 641a upward or downward. Alternatively, the pillar 641b may have cogged or toothed structures along the pillar 641b for directly engaging the gear.

Gear 643 includes a toothed wheel that engages cogs on rack 615 for moving rack 615 and the elevation device 614 when gear 643 rotates. In at least one embodiment, gear 643 is driven by the second motor 616.

In at least one embodiment, elevation device 614 may move upward or downward inside display space 620 to raise or lower the display item 111 in the display space 620. In another embodiment, elevation device 614 may move display item 111 between display space 620 and concealed space 642. In at least one embodiment, the platform 641a of elevation device 614 in the display space 620 moves downward into concealed space 642 that is below the floor of the display space 620. In at least one embodiment, the display item 111 on the platform 641a leaves the display space 620 and enters concealed space 642 through an opening or a door on the floor of display space 620. Therefore, viewers can see that the display item 111 moves downward and enters concealed space 642. In another embodiment, when the platform 641a of elevation device 614 rises from the concealed space 642 to the same level as the floor of the display space 620, the entirely of display item 111 comes to display in the display space 620. Installation of concealed spaces can be flexible in order to meet different requirements, such as whether and/or where to hide display item 111 or performers, or the position and number of concealed spaces needed for the exhibition or performance.

Figure 7A:
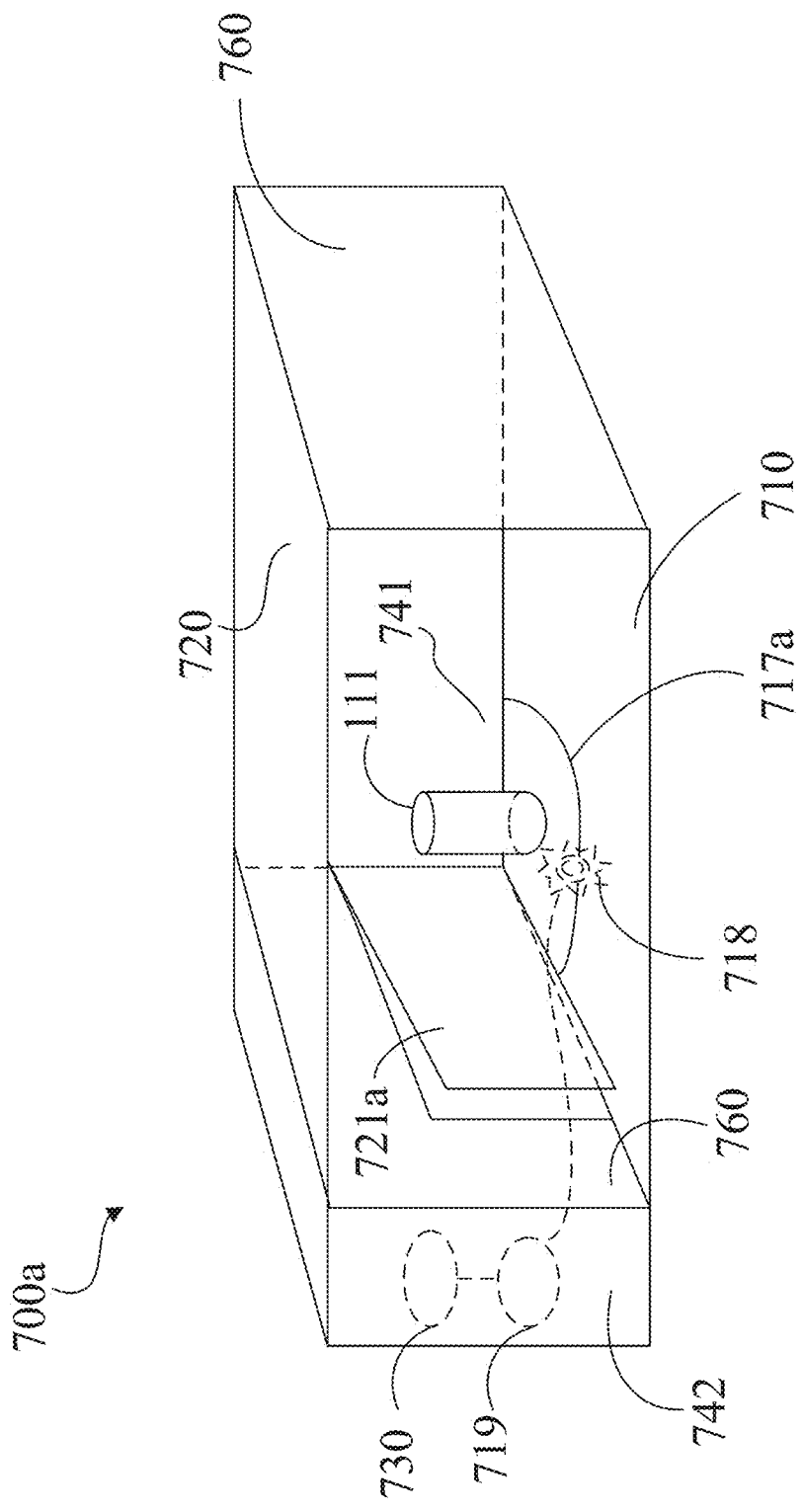
FIG. 7A shows a block diagram of an embodiment of a display system including a turntable.

FIG. 7A shows a block diagram of an embodiment of display system 700a including a turntable. Display system 700a includes at least display item 111, a display panel 710, a display space 720, a control module 730, a transmission device 741, a concealed space 742, a first turntable 717a, a first gear wheel 718, a third motor 719, a door 721a, and boards 760. In other embodiments, display system 700a may not have all of the elements or features listed and/or may have other elements or features instead of, or in addition to, those listed.

FIG. 7A shows an embodiment of display system 700a including a first turntable for moving display item 111. In FIG. 7A, a portion of the first turntable is inside the display space and another portion outside the display space (e.g., in concealed space or outside display system 700a). In at least one embodiment, the first turntable may transport display item 111 between display space and concealed space. Display panel 710, display space 720, and control module 730 may be embodiments of display panel 110, display space 120, and control module 130, respectively, which were discussed in conjunction with FIG. 1. Transmission device 741 and concealed space 742 may be embodiments of transmission device 441 and concealed space 442, respectively, which were discussed in conjunction with FIGS. 4A and 4B.

As shown in FIG. 7A, display system 700a includes one flat display panel 710 and five flat opaque boards 760 to form an enclosure (e.g., a box) that defines the display space 720. In another embodiment, the enclosure of display system 700a may have more than one display panel 710. In other embodiments, display space 720 may be open environment and may include other structures to define the display space 720.

First turntable 717a is a turntable for carrying and moving display item 111 and/or performers when the first turntable 717a rotates. In at least one embodiment, the first turntable 717a is installed at the bottom of the display system 700a, with a portion of first turn table 717a located inside display space 720. In at least one embodiment, the first turntable 717a moves display item 111 from one location to another location within display space 720, and/or between display space 720 and concealed space 742. In at least one embodiment, the first turntable 717a includes a first gear wheel that is driven by a third motor.

First gear wheel 718 is a gear wheel that is connected to the first turntable 717a and is coaxial with the first turntable 717a. In at least one embodiment, turning the first gear wheel 718 by the third motor rotates the first turntable 717a.

Third motor 719 is a motor that is connected to the first gear wheel 718 for rotating the first turntable 717a. In at least one embodiment, third motor 719 receives commands from the control module 730, which cause the third motor 719 to rotate the first turntable 717a in either direction and/or in certain speed.

Door 721a is a door or a gate that separates display space 720 and concealed space 742. In at least one embodiment, door 721a rotates about an axle to open and close, and allows display item 111 and/or performers to move between display space 720 and concealed space 742. In at least one embodiment, door 721a is kept closed to prevent viewers from seeing the items or performers inside concealed space 721. In at least one embodiment, door 721a may be spring loaded or mechanically biased. In at least one embodiment, the opening and/or closing of door 721a is controlled by control module 730.

In at least one embodiment, concealed space 742 is located on one side of the display space 720. For example in FIG. 7A, concealed space 742 is installed on the left side of display space 720 when a viewer looks through display panel 710 into the display space 720. Third motor 719 drives the first gear wheel 718 and rotates the first turntable 717a that is installed at the bottom of the display system 700a. Therefore, display item 111 on the first turntable 717a moves in the same direction as the movement of the first turntable 717a. In other embodiments, performers on the first turntable 717a may be moved as well, when first turntable 717a rotates. In at least one embodiment, the door 721a installed between display space 20 and concealed space 42 is opened, thus allowing the display item 111 in the display space 720 to enter the concealed space 742 when the first turntable 717a rotates in a clockwise direction (from top view of the display system 700a). In at least one embodiment, after the first turntable 717a moves the display item 111 from display space 720 into the concealed space 42, or verse visa, the door 721a is closed and separates display space 720 and concealed space 742.

Figure 7B:
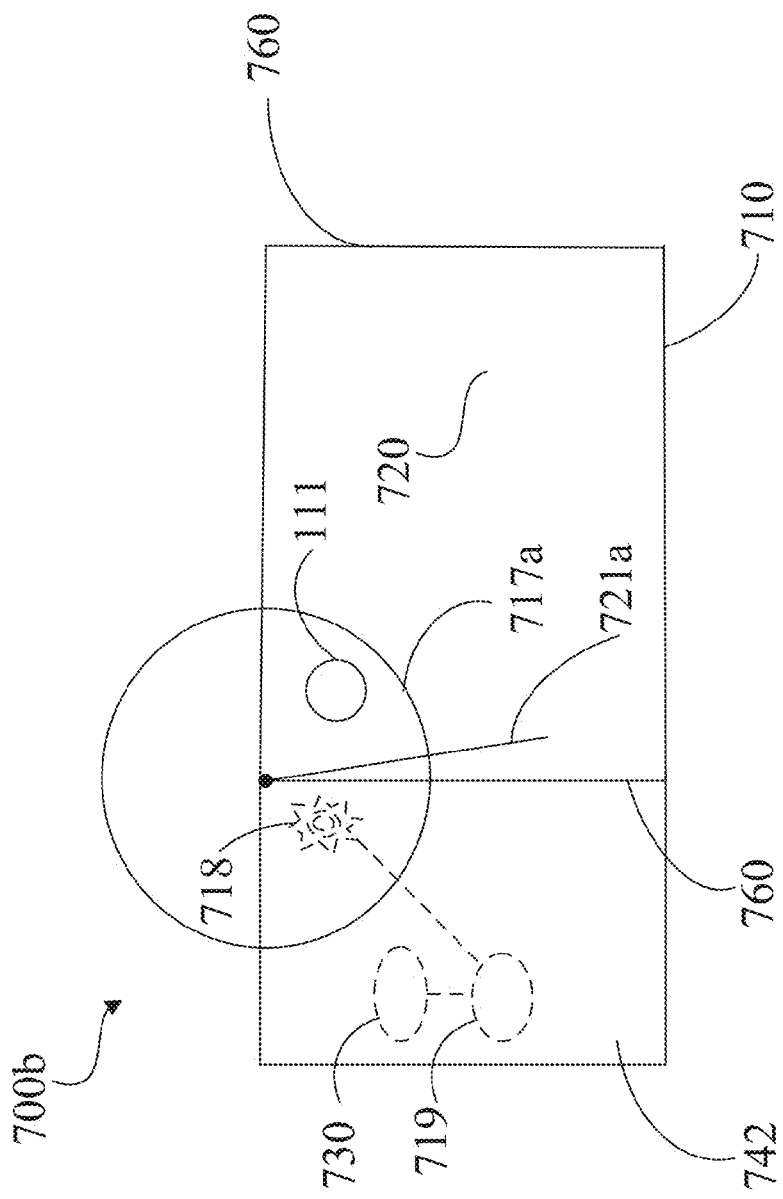
FIG. 7B shows a top view of an embodiment of the display system of FIG. 7A.

FIG. 7B shows a top view 700b of an embodiment of display system 700a of FIG. 7A. FIG. 7B includes display item 111, display panel 710, display space 720, control module 730, concealed space 742, first turntable 717a, first gear wheel 718, third motor 719, door 721a, and boards 760. In other embodiments, FIG. 7B may not have all of the elements or features listed and/or may have other elements or features instead of, or in addition to, those listed.

FIG. 7B shows that a portion of circular first turntable 717a is located inside display space 720. Optionally, the turntable may have any of a number shapes, and may be used to move display item 111. In FIG. 7B, the axle of door 721a is close to the center of the first turntable 717a, and the door 721a may open toward the concealed space 742 in order to allow display item 111 to enter concealed space 742. Optionally, door 721a may open toward display space 720.

Figure 7C:
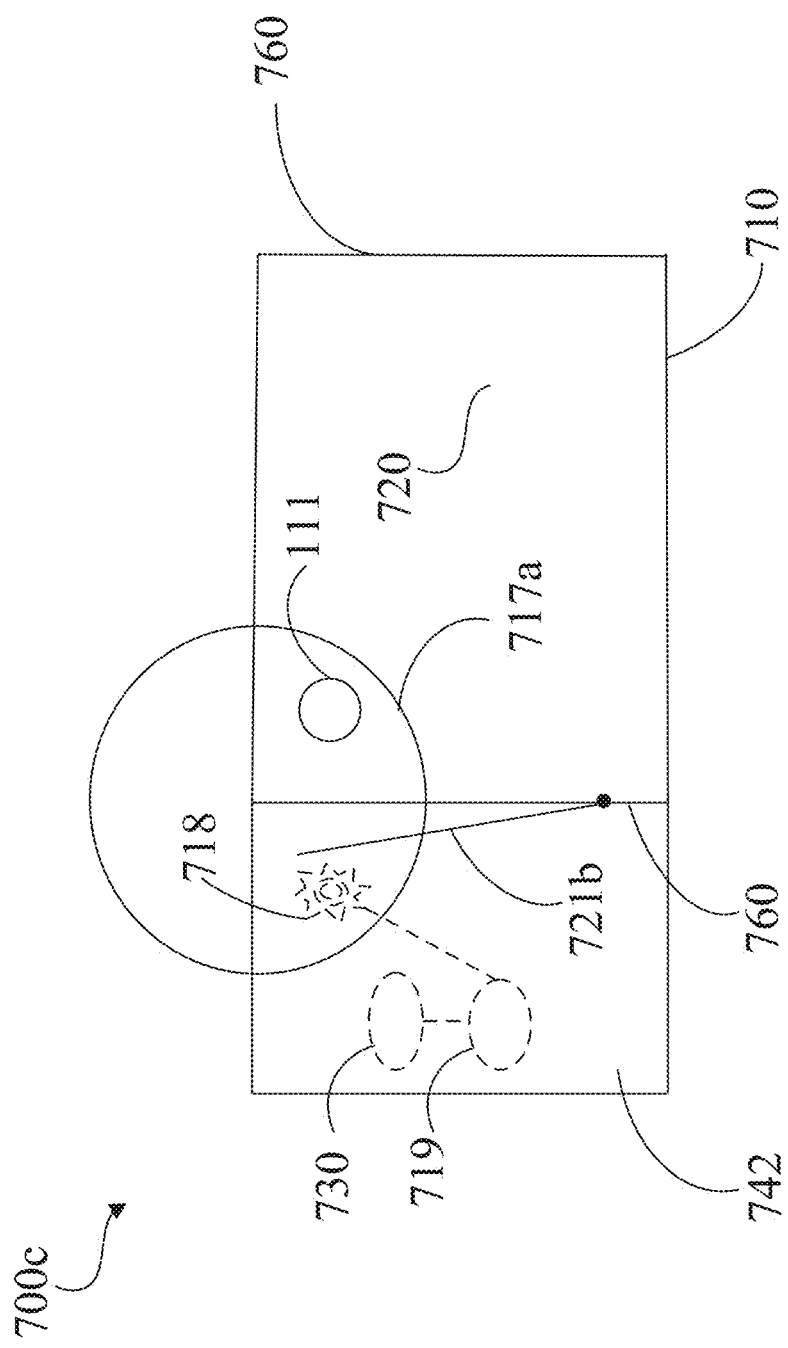
FIG. 7C shows a top view of another embodiment of the display system of FIG. 7A.

FIG. 7C shows a top view 700c of another embodiment of display system 700a of FIG. 7A. FIG. 7C includes display item 111, display panel 710, display space 720, control module 730, concealed space 742, first turntable 717a, first gear wheel 718, third motor 719, and boards 760. FIG. 7C also includes door 721b. In other embodiments, FIG. 7C may not have all of the elements or features listed and/or may have other elements or features instead of, or in addition to, those listed.

FIG. 7C includes a door 721b having an axle that is close to the display panel 710, while the axle of the first turntable 717a is away from the display panel 710. In FIG. 7C, the door 721b may open in either direction to open, thus allowing display item 111 to move between display space 720 and concealed space 742 when the first turntable 717a rotates.

Figure 7D:
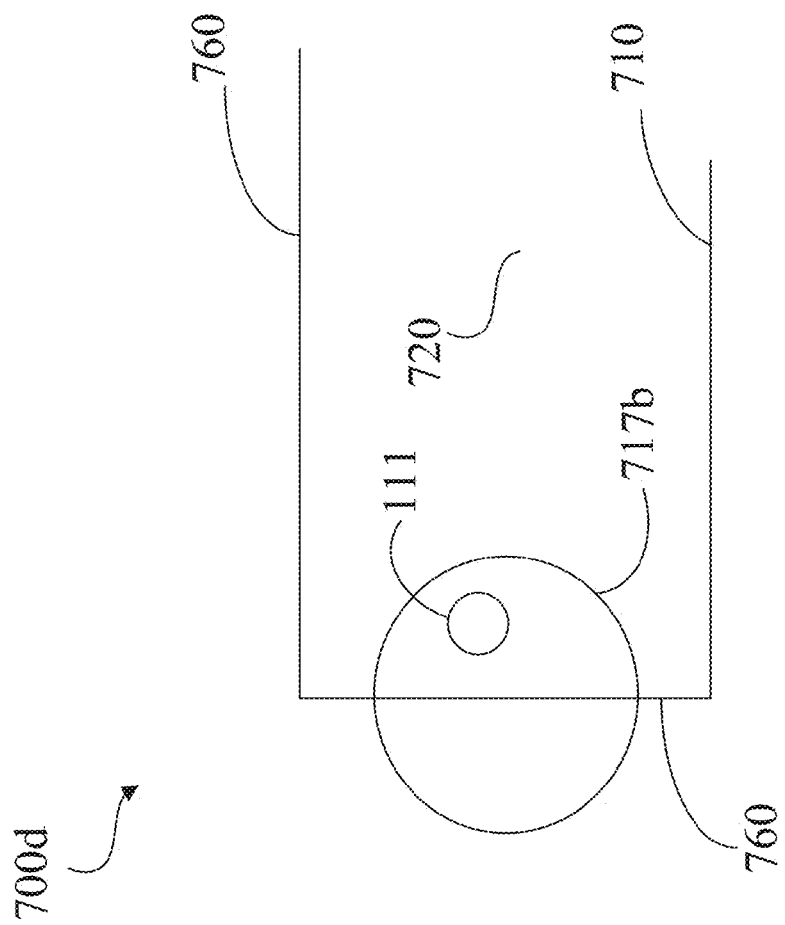
FIG. 7D shows a top view of an alternative embodiment of the display system of FIG. 7A.

FIG. 7D shows a top view 700d of an alternative embodiment of display system 700a of FIG. 7A. FIG. 7D includes display item 111, display panel 710, display space 720, and boards 760. FIG. 7D also includes a turntable 717b. In other embodiments, FIG. 7D may not have all of the elements or features listed and/or may have other elements or features instead of, or in addition to, those listed.

FIG. 7D shows an alternative embodiment of display system 700a of FIG. 7A. In FIG. 7D, a turntable 717b, which may be similar to turntable 717a, is installed with a part (e.g., a half) of turntable 717*b* located within display space 720 while the other part of turn table 717*b* located outside display space 720 (e.g., in a concealed space). In FIG. 7D, turntable 717*b* may rotate in either direction to move display item 111 into or outside of display space 720.

Figure 7E:
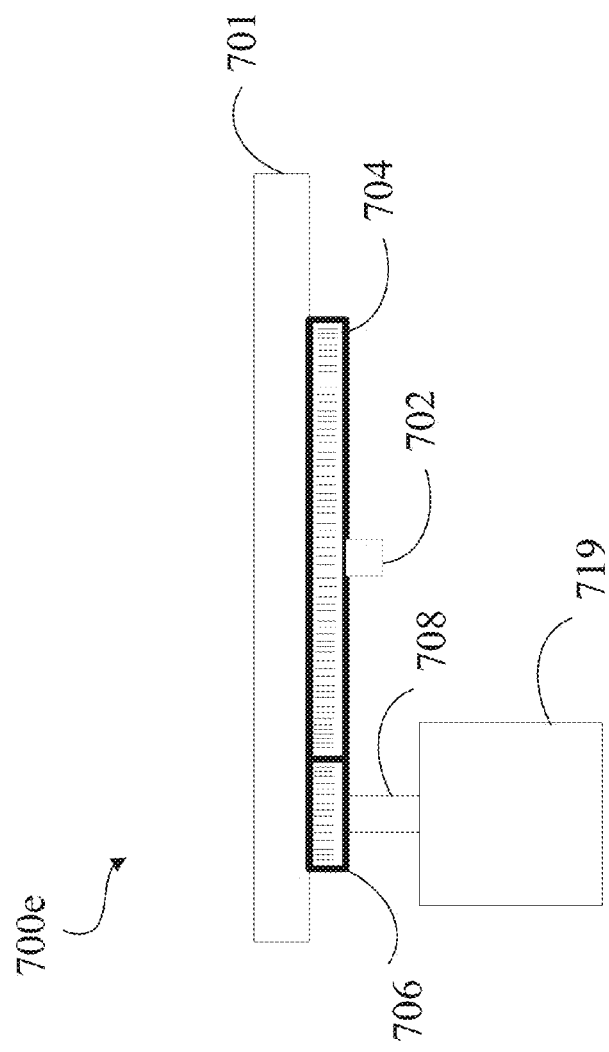
FIG. 7E shows an embodiment of a motor driving a turntable.

FIG. 7E shows a block diagram of an embodiment of a motor driving a turntable. FIG. 7E includes at least a turntable 701, an axle 702, a gear 704, a motor gear 706, a motor shaft 708, and a motor 719. In other embodiments, the assembly of FIG. 7E may not have all of the elements or features listed and/or may have other elements or features instead of, or in addition to, those listed.

Turntable 701 may be an embodiment of turntable 717*a* or 717*b* as discussed in conjunction with FIGS. 7A-D. The axle 702 is an axle on which the turntable 701 rotates. In at least one embodiment, gear 704 is mounted to the axle 702 and rotates with the axle 702. In at least one embodiment, gear 704 includes teeth or cogs that engage with the teeth or cogs of a motor gear 706 that is mounted to a motor shaft 708 of first motor 719. In at least one embodiment, the first motor 719 rotates the motor shaft 708 and the motor gear 706, which in turn rotates the gear 704 that is mounted on the axle 702, which in turn rotates axles axle 702, thereby rotating the turntable 701. Alternatively, the turntable 701 may be directly mounted to the motor shaft 708 of the first motor 719. In other embodiment, display system may include other gears and/or structures for rotating a turntable.

Figure 8A:
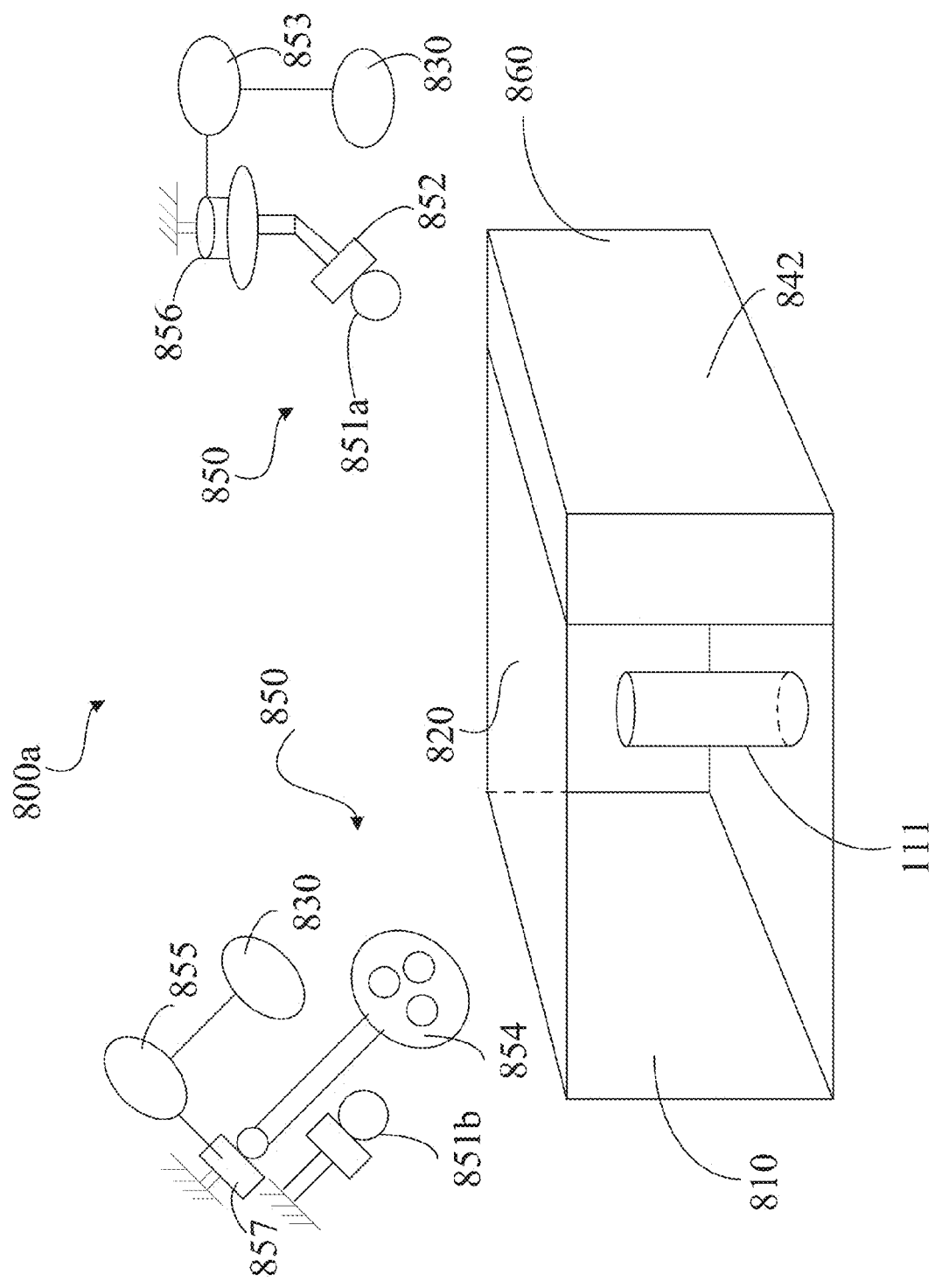
FIG. 8A shows a block diagram of an embodiment of a display system including lighting devices.

FIG. 8A shows a block diagram of an embodiment of display system 800*a* including lighting devices. Display system 800*a* includes at least display item 111, a display panel 810, a display space 820, a control module 830, a concealed space 842, lighting module 850, a first lighting devices 851*a*, a second lighting device 851*b*, a second turntable 852, a fourth motor 853, a third turntable 854, a fifth motor 855, a second gear wheel 856, and a third gear wheel 857. In other embodiments, display system 800*a* may not have all of the elements or features listed and/or may have other elements or features instead of, or in addition to, those listed.

FIG. 8A shows that lighting module 850 includes one or more lighting devices and/or motion devices for controlling light effects. As shown in FIG. 8A, a first lighting device is installed on a second turntable that may be rotated by a fourth motor. A second lighting device is installed together with a third turntable that may be rotated by a fifth motor, which third turntable includes multiple holes covered by transparent materials of different colors for changing light beams to a certain color. In at least one embodiment, control module 830 controls first and/or second lighting devices for adjusting and enhancing visual effects of the exhibition or performance. Control module 830 may control the on and off of each lighting device, and may adjust the brightness, colors, directions, and/or beam angles of the light beams from each lighting device. In at least one embodiment, lighting module 850 may include other structures and/or devices. In other embodiments, any number of lighting devices and/or turntables may be included in lighting module 850. Also, the lighting devices and turntables may have other, shapes, and/or sizes, other turntables, gears, and/or motors may be added to, or substituted for, the lighting devices of lighting module 850 to obtain different embodiments.

Display panel 810, display space 820, control module 830, and lighting module 850 may be embodiments of display panel 110, display space 120, control module 130, and lighting module 250, respectively, which were discussed in conjunction with FIGS. 1 and 2. Concealed space 842 may be an embodiment of concealed space 442, which was discussed in conjunction with FIG. 4B.

First lighting device 851*a* is a lighting device that is installed on a second turntable. FIG. 8A shows a side view of lighting device 851*a* and the second turntable. In at least one embodiment, first lighting device 851*a* uses artificial light sources, such as light bulbs, lamps and light fixtures. In at least one embodiment, the first lighting device 851*a* is a spotlight. In at least one embodiment, first lighting device 851 has different colors and/or effects, and may focus light beams on display item 111, performers, and/or other locations. In at least one embodiment, first lighting device 851*a* may be the same as the second lighting device. In another embodiment, first lighting device 851*a* may or may not include structures that can change the color of light beams emitted from lighting device 851*a*. In at least one embodiment, first lighting device 851*a* is installed inside or outside of display space 820, according to the needs of the exhibition or performance. In an embodiment in which display system 800*a* is installed in a show window of a retail store, first lighting device 851*a* may be installed inside or outside the show window.

Second lighting device 851*b* is similar to first lighting device 851*a*. FIG. 8A shows a side view of second lighting device 815*b*. Second lighting device 851*b* is installed close to a third turntable that has multiple holes, so that the light from the second lighting device 851*b* goes through one of the holes on the third turntable and form a light beam going into the display space 820.

Second turntable 852 is a turntable on which the first lighting device 851*a* is installed. In at least one embodiment, second turntable 852 is connected to a second gear wheel that is driven by a fourth motor, to adjust the direction of the light beam from the first lighting device 851*a*. FIG. 8A shows a side view of the turntable 852. In at least one embodiment, turntable 852 may include a circular disk, which may include color filters for filtering light from first lighting device 851*a* and/or may include colored light bulbs and/or turntable 852 may include other structures. Second turntable 852 is optional, and first lighting device 851*a* may be used to just adjust the brightness of the display, while second lighting device 851*b* may be used to adjust the color.

Fourth motor 853 is a motor that engages and drives the second gear wheel to rotate the second turntable 852 when electricity is provided (and/or the appropriate control signals are received). In at least one embodiment, fourth motor 853 receives control commands from the control module 830 and rotates the second turntable 852, according to the commands.

Third turntable 854 is a turntable with multiple holes that allows light emitted from second lighting device 851*b* to go through. In at least one embodiment, the third turntable 854 is connected to a third gear wheel, which is driven by a fifth motor for rotating the third turntable 854. However, in contrast to second turntable 852, a front-side view of third turntable 854 is illustrated in FIG. 8A, instead of a side view. In at least one embodiment, turntable 854 may include a circular disk with multiple holes (e.g., three holes as shown in FIG. 8A, or other numbers of holes). In at least one embodiment, the multiple holes on third turntable 854 are covered with transparent materials (e.g., glass, transparent plastic), while the material covering each hole has a different color (e.g., the transparent materials covering one hole is in red, another hole in blue, yet another hole in yellow). In at least one embodiment, the third turntable 854 is rotated by fifth motor to place one of the multiple holes in a certain color in alignment with the second lighting device 851*b*. In at least one embodiment, the light beam from second lighting device 851*b*, after passing through colored transparent material that covers the hole on the third turntable 854, turns to the same color as the material that covers the hole. In at least one embodiment, multiple light beams of different colors are combined to create new colors and/or to otherwise enhance the lighting effects in display space 820 under the control of lighting module 850 and/or control module 830.

Fifth motor 855 is a motor that engages and drives the third gear wheel to rotate the third turntable 854. In at least one embodiment, fifth motor 855 receives control commands from the control module 830 and rotates the third turntable 854, accordingly.

Second gear wheel 856 is a gear wheel that is connected to the second turntable 852. In at least one embodiment, second gear wheel 856 is driven by the fourth motor 853, which in turn rotates the second turntable 852. FIG. 8A shows a front-side view of second gear wheel 856.

Third gear wheel 857 is a gear wheel that is connected to the third turntable 854. In at least one embodiment, third gear wheel 857 is driven by the fifth motor 855, which in turn rotates the third turntable 854. However, in contrast to second gear wheel 856, a side view of third gear wheel 857 is illustrated in FIG. 8A, instead of a front-side view.

Figure 8B:
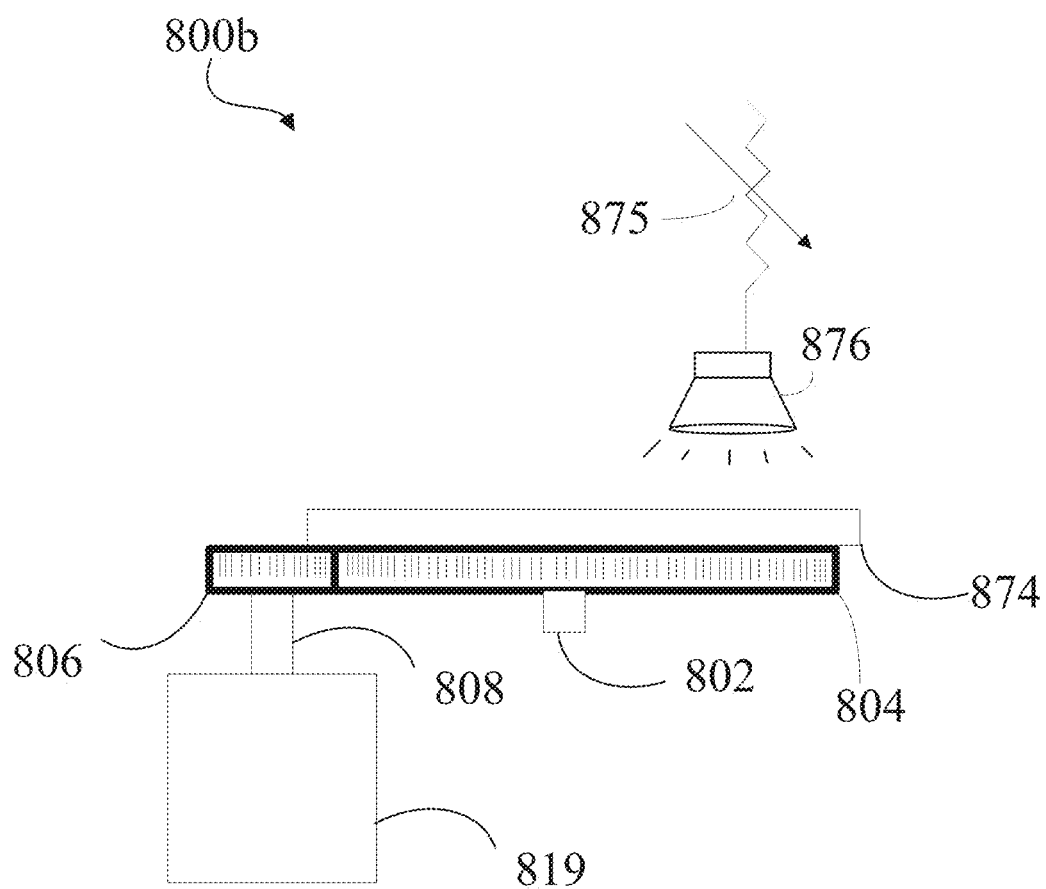
FIG. 8B shows an embodiment of a lighting system that may be used within the system of FIG. 8A (or with any of the other of the embodiments of this specification)

FIG. 8B shows lighting system 800*b* may include axle 802, gear 804, motor gear 806, motor shaft 808, motor 819, color filter 874, variable resistor 875, and light 876. In other embodiments, the assembly of lighting system 800*b* may not have all of the elements or features listed and/or may have other elements or features instead of, or in addition to, those listed.

Axle 802, gear 804, motor gear 806, motor shaft 808, and motor 819 may be similar to the axle 702, gear 704, motor gear 706, motor shaft 708, and motor 719, respectively, which were discussed above in conjunction with FIG. 7E. However, in FIG. 8B axle 802 supports color filter 874 rather than the turntable 701 of FIG. 7E. In FIG. 8B, the motor 819 may be an embodiment of either of the fourth motor 853 and the fifth motor 855 of FIG. 8A. Color filter assembly 874 may be associated with a gear (e.g., gear 804). For example, the color filter assembly 874 may have teeth along the perimeter of the gear that may be attached to the bottom of color filter assembly 874. Color filter assembly 874 may be a disk with a plurality of windows in which each of the windows has a different color filter. Variable resistor 875 may control the current and/or voltage and therefore the power supplied to the light. Varying the power supplied to the light causes the intensity of the light to vary. A controller may be communicatively attached to, and automatically control, variable resistor 875, so that the controller may adjust the intensity of a particular color of light, and thereby vary the brightness and/or color of light. Light 876 produces multiple frequencies of light simultaneously. For example, the combination of the different frequencies of light emitted by light 876 may appear as white light (in which case light 876 would be a white light). Light 876 shines through a color filter of color filter assembly 874 to produce light of a particular color. Motor 819 rotates motor shaft 808, which rotates motor gear 806. Motor gear 806 may include holes in the gear for light to shine through. Motor gear 806 engages the gear associated with/attached to color filter assembly 874, so that as motor gear 806 turns, color filter assembly 874 turns. Motor 819 is actuated by the controller, which determines how long to run motor 819 in order to place the desired color filter of color filter assembly 874 under light 876 to produce a desired color of light. In another embodiment, the color filter assembly 874 is held stationary, while the light 876 is placed on a turntable. In which case, the light 876 is moved, via the turntable to align light 876 with a desired color filter. Alternatively three different colored light bulbs may be used for adjusting the color of the light. Light 876 of FIG. 8B may be an example of lighting device 851*a* or 851*b*. Turntable 701 of FIG. 8B may be an embodiment of second turntable 852 or third turntable 854 (or other turn tables), for example. Gear 804 of FIG. 8B may be an embodiment of gear wheel 856 or 857, for example. Motor 819 of FIG. 8B may be an example of motor 853 or 855. In at least one embodiment, the assembly of FIG. 8B may be substituted for some or all of the devices and/or structures of lighting module 850 of FIG. 8A. For example, in at least one embodiment, the assembly of FIG. 8B is connected to control module 830 and replaces the fifth motor 855, third gear wheel 857, second lighting device 851*b*, and third turntable 854. Alternatively or additionally, the assembly of FIG. 8B is connected to control module 830 and replaces the fourth motor 853, first lighting device 851*a*, second turntable 852, and second gear wheel 856.

Figure 8C:
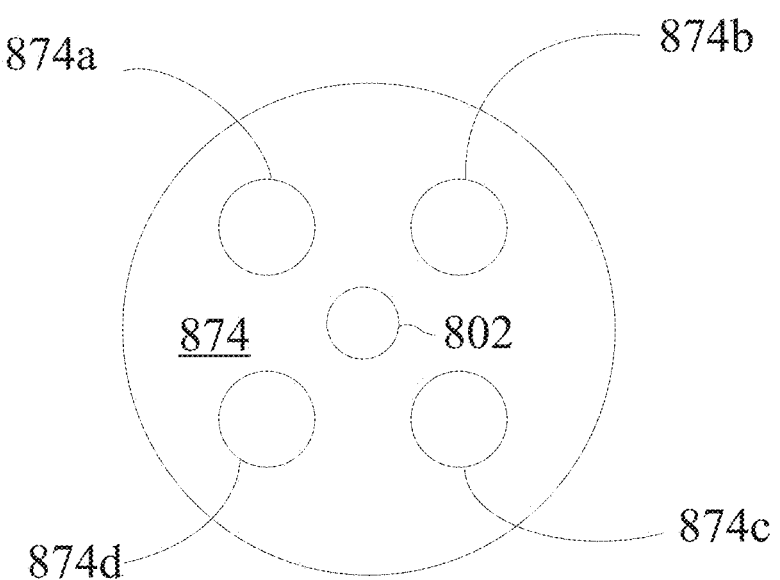
FIG. 8C shows an embodiment of color filter assembly used in the lighting system of FIG. 8B.

FIG. 8C shows an embodiment of color filter assembly 874 with axle 802 of FIG. 8B. Color filter assembly 874 may include windows 874*a-d*. In other embodiments, the assembly of color filter assembly 874 may not have all of the elements or features listed and/or may have other elements or features instead of, or in addition to, those listed.

One of windows 874*a-d* may include clear transparent piece of material (glass or plastic) and/or may be empty. The other three of windows 874*a-d* may have different color filters, each filter may be a different primary color, such that combinations of the light form the different filters may be used to form other colors of light within a continuum of colors within a color space formed by the three filters. For example, window 874*a* may be clear, and windows 874*b-d* may be red, green and yellow, respectively; red, blue, and yellow, respectively; red, blue and green, respectively; or magenta, cyan, and yellow, respectively. By including three color filter assemblies, such as color filter assembly 874, different colors from different filters may be mixed to form new colors that are different than the colors of the filters.

Figure 8D:
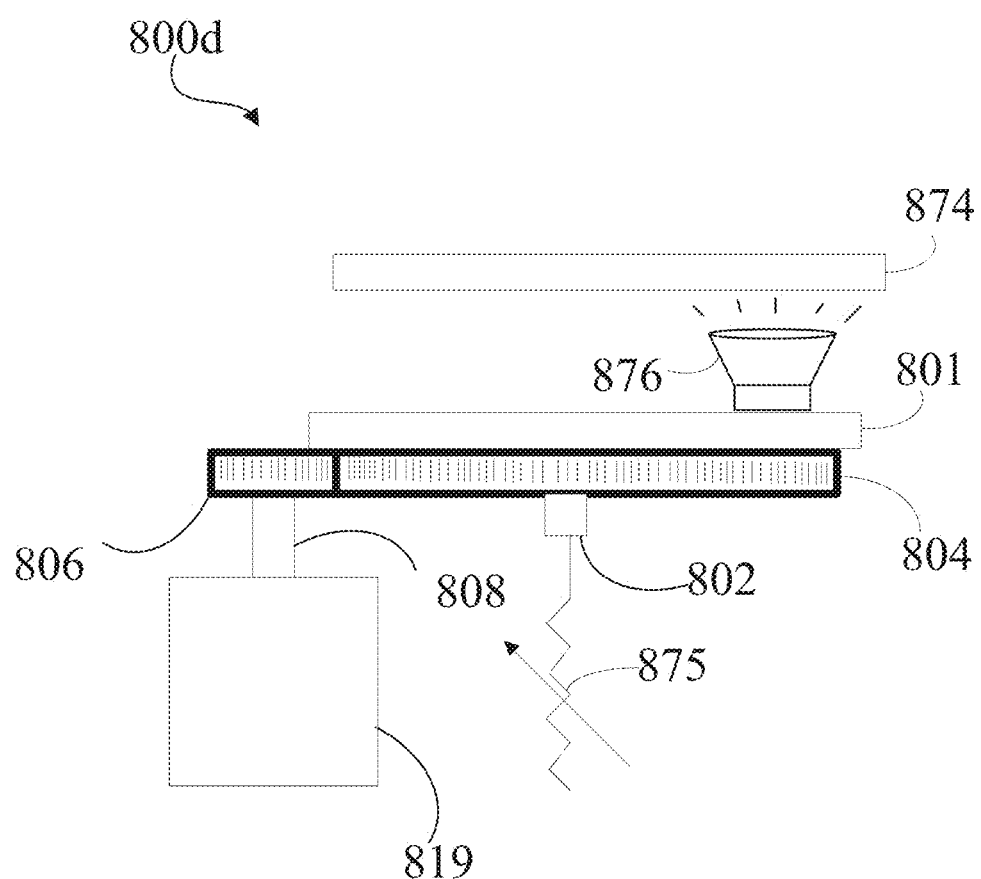
FIG. 8D shows an embodiment of another lighting system that may be used in the embodiment of FIG. 8A (or with any of the other of the embodiments of this specification)

FIG. 8D shows another embodiment of lighting system 800*b*, which may include turntable 701, axle 802, gear 804, motor gear 806, motor shaft 808, motor 819, color filter 874, variable resistor 875, and light 876. In other embodiments, the assembly of lighting system 800*b* may not have all of the elements or features listed and/or may have other elements or features instead of, or in addition to, those listed.

Turntable 801, axle 802, gear 804, motor gear 806, motor shaft 808, motor 819, color filter 874, variable resistor 875, and light 876 were discussed in conjunction with FIG. 8B. Further details of an embodiment of color filter 874 are discussed in conjunction with FIG. 8C. The embodiment of FIG. 8D differs from the embodiment of FIG. 8C in that in FIG. 8D light 876 is mounted on the turntable 701 and filter 874 is held stationary (instead of holding light 876 in a stationary position and placing color filter 874 on the turntable, as shown in FIG. 8B). In the embodiment of FIG. 8D, electrical connections are established with light 876 via wires and electrical connections in turntable 701 (rather than directly with light 876 as in FIG. 8B). Variable resistor 875 establishes an electrical connection with light 876, via axle 802 and turntable 701. In the embodiment of FIG. 8D, there is no need for gear 804 to have holes. Instead, gear 804 may be a solid disk with teeth jutting out at the perimeter, because in the embodiment of FIG. 8B, light does not need to pass through gear 804. The lighting systems of FIGS. 8B and 8D may be used together in the same embodiment. For example, there may be beams of colored light shined onto the display item 111. One or more the light beams may be produced by the lighting system of FIG. 8B, and one or more of the light beams may be produced by the lighting system of FIG. 8D. Light 876 of FIG. 8D may be an example of lighting device 851a or 851b (FIG. 8A). Turntable 701 of FIG. 8D may be an embodiment of turntable 852 or 854 (FIG. 8A) (or other turn tables), for example. Gear 804 of FIG. 8D may be an embodiment of gear wheel 856 or 857 (FIG. 8A), for example. Motor 819 of FIG. 8D may be an example of motor 853 or 855 (FIG. 8A). In at least one embodiment, the assembly of FIG. 8D may be substituted for some or all of the devices and/or structures of lighting module 850 of FIG. 8A. For example, in at least one embodiment, the assembly of FIG. 8D is connected to control module 830 and replaces the fifth motor 855, third gear wheel 857, second lighting device 851b, and third turntable 854. Alternatively or additionally, the assembly of FIG. 8D is connected to control module 830 and replaces the fourth motor 853, first lighting device 851a, second turntable 852, and second gear wheel 856.

FIG. 9 shows a block diagram of an embodiment of display system 900 including multiple display panels. Display system 900 includes at least display item 111, three display panels 910a-c, a display space 920, and a background setting 912. In other embodiments, display system 900 may not have all of the elements or features listed and/or may have other elements or features instead of, or in addition to, those listed.

Each of the three display panels 910a-c may be an embodiment of display panel 110 that was discussed in conjunction with FIG. 1. Display space 920 and background setting 912 may be embodiments of display space 120 and background setting 112, as discussed in conjunction with FIG. 1.

FIG. 9 shows that display system 900 includes three flat display panels 910a-c that are consecutively placed. The three display panels 910a-c, together with background setting 912, define display space 920 that has a horizontal cross-section of a trapezoid (as shown in FIG. 9) or other shapes. In at least one embodiment, the sides of two adjacent display panels (e.g., display panels 910a and 910b, or 910b and 910c) are joined together, and the other sides of display panels 910a and 910c are installed adjacent to the background setting 912 (e.g., a wall). In at least one embodiment, the display system 900 is an open-ended installation with three display panels 910a-c outlining part of the region of a display space 920. Viewers may see display item 111 in front of either of the display panels 910a-c.

In at least one embodiment, display system 900 includes one or more display panels, with or without boards for limiting display space 920. In at least one embodiment, the one or more display panels, together with structures in the environment (e.g., a wall, a pillar, a ceiling, and a floor), defines display space 920. For example, a display system may be installed on a stage in a theater, with one or more display panels that are as big as the stage. In another embodiment, one or more display panels as small as a stage for puppet shows may be installed, with or without a motion module installed above the stage for controlling the puppets.

Figure 10:
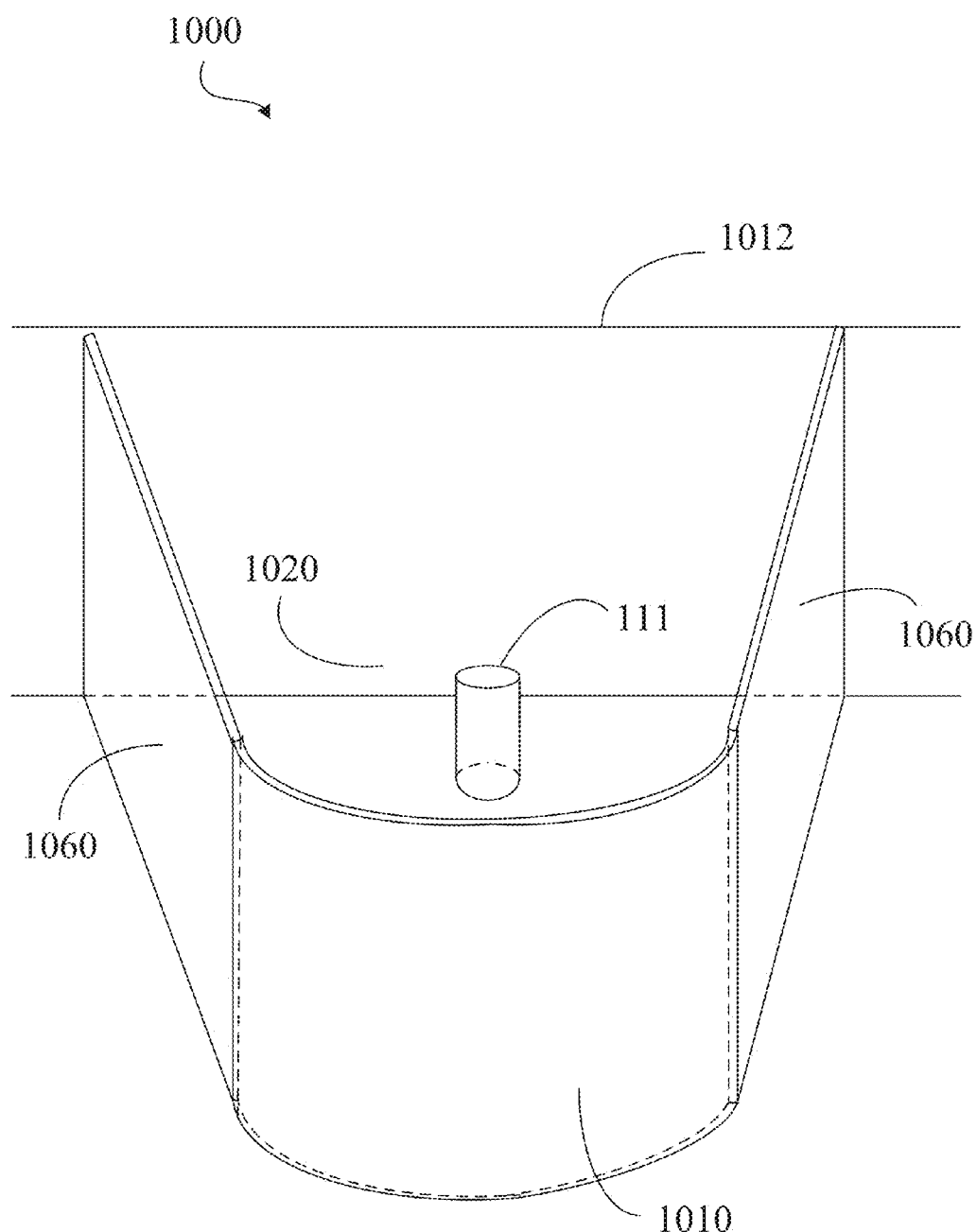
FIG. 10 shows a block diagram of an embodiment of a display system including a curved display panel and side boards.

FIG. 10 shows a block diagram of an embodiment of display system 1000 including a curved display panel and side boards. Display system 1000 includes at least display item 111, a display panel 1010, a background setting 1012, a display space 1020, and two boards 1060. In other embodiments, display system 1000 may not have all of the elements or features listed and/or may have other elements or features instead of, or in addition to, those listed.

Display panel 1010, background setting 1012, and display space 1020 may be embodiments of display panel 110, background setting 112, and display space 120, which were discussed in conjunction with FIG. 1. Boards 1060 may be embodiments of boards 360 as discussed in conjunction with FIG. 3.

FIG. 10 shows that display system 1000 includes a curved display panel 1010 and two flat boards 1060 installed on either side of the curved display panel 1010. As shown in FIG. 10, display space 1020 is defined by the display panel 1010, two boards 1060, and the background setting 1012. In at least one embodiment, the boards 1060 are made from non-transparent material, therefore only allowing a viewer to see the display item 111 when the viewer is in a limited range in front of the display panel 1010. In another embodiment, the boards 1060 may be transparent or semi-transparent. In other embodiments, display system 1000 may include other numbers, shapes, and/or sizes of display panels and/or boards.

Figure 11:
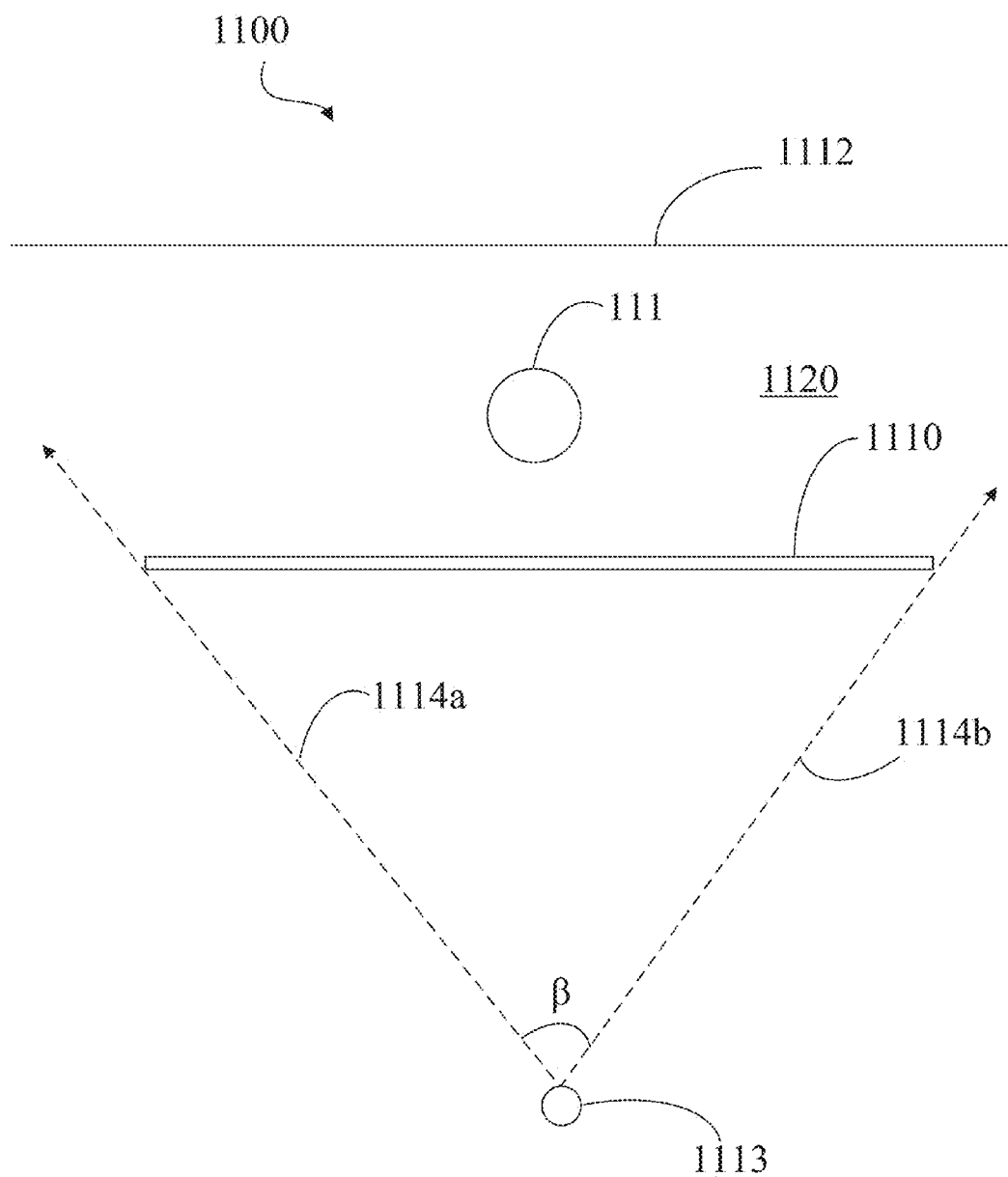
FIG. 11 shows a top view of an embodiment of a display system showing viewing angle of a viewer.

FIG. 11 shows a block diagram of an embodiment of display system 1100 showing view angle of a viewer. Display system 1100 includes at least display item 111, a display panel 1110, a background setting 1112, a viewer 1113, arrows 1114a and 1114b, and a display space 1120. In other embodiments, display system 1100 may not have all of the elements or features listed and/or may have other elements or features instead of, or in addition to, those listed.

Display panel 1110, display space 1120, and background setting 1112 may be embodiments of display panel 110, display space 120, and background setting 112, respectively, which were discussed in conjunction with FIG. 1.

FIG. 11 shows a top view of display system 1100 that includes one flat display panel 1110 that is installed in parallel with and/or in front of background setting 1112 of the environment where the display system 1100 is installed. In at least one embodiment, display space 1120 is between display panel 1110 and background setting 1112. In at least one embodiment, the width and height of display space 1120 is limited by the size of the display panel 1110. In at least one embodiment, the viewer is on the side of display panel 1110 opposite the background setting 1112. In at least one embodiment, the width of display space 1120 is limited by the width of display panel 1120 and an angle $\beta$, which is the maximum angle at which the display item 111 can be viewed through display panel 1110 by a viewer that is at a specific location. In at least one embodiment, the angle $\beta$ is limited by the size of display panel 1110 (e.g., the smaller the display panel 1110, the smaller the angle $\beta$) and/or the distance between the viewer and the display panel 1110 (e.g., the closer the display panel 1110 toward the viewer, the larger the angle $\beta$). Additionally, if the display panel is constructed from a birefringent material sandwiched between two polarizers, the viewing angle is also constrained by the display panel itself (e.g., a twisted nematic liquid crystal display panel may have a maximum viewing angle of about 30 degrees, for example). In at least one embodiment, angle $\beta$ also changes when the viewer changes from one location to another. In at least one embodiment, the depth of display space 1120 is limited by the environment where the display system 1100 is installed (e.g., the distance between the display panel 1110 and the background setting 1112). For example, the display system 1100 is installed by a wall of a building, and display space 11120 is limited by the distance between the display panel 1110 and the wall. In other embodiments, other factors may also limit the display space 1120 such as the illumination.

Viewer 1113 may be a human being that can see display item 111 through display panel 1110 and/or watches multimedia contents that are played on the display panel 1110. In another embodiment, viewer 1113 may be a device having a camera or a video recorder for recording the exhibition or performance. In at least one embodiment, more than one viewer 1113 may view the display system 1100.

Arrows 1114*a* and 1114*b* are two arrows indicating the maximum angle on either side of viewer 1113, at which the display item 111 can be viewed through display panel 1110 while the viewer is standing in the center of the front display panel (assuming that the viewing angle is not further limited by total internal reflection and/or by a birefringent effect that the display panel relies upon to create a display).

Figure 12:
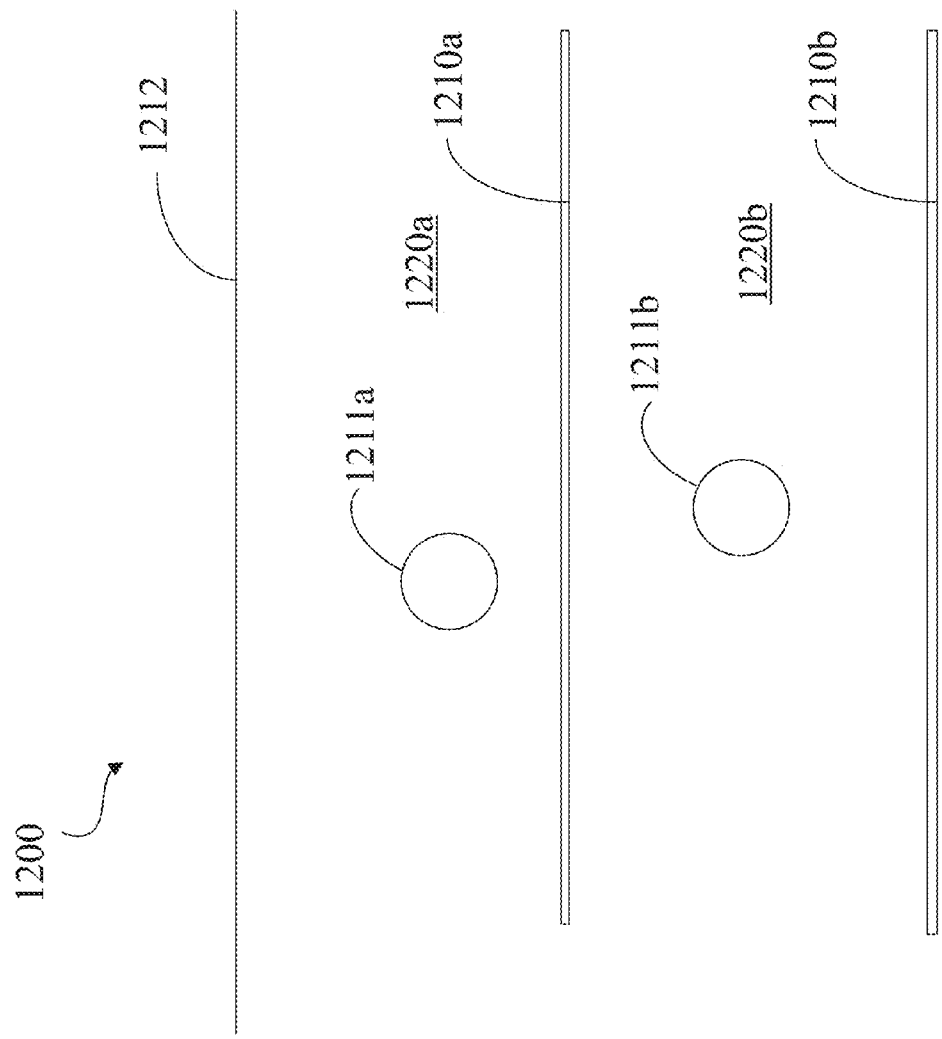
FIG. 12 shows a top view of an embodiment of a display system including multiple display panels and display spaces.

FIG. 12 shows a block diagram of an embodiment of display system 1200 including multiple display panels and display spaces. Display system 1200 includes at least two display items 1211*a* and 1211*b*, two display panels 1210*a* and 1210*b*, a background setting 1212, and two display spaces 1220*a* and 1220*b*. In other embodiments, display system 1200 may not have all of the elements or features listed and/or may have other elements or features instead of, or in addition to, those listed.

Either of display items 1211*a* and 1211*b* may be an embodiment of display item 111 as discussed in conjunction with FIG. 1. Either of display panels 1210*a* and 1210*b* may be an embodiment of display panel 110, as discussed in conjunction with FIG. 1. Background setting 1212 may be an embodiment of background setting 112 as discussed in conjunction with FIG. 1. Display space 1220*a* is between display panel 1210*a* and background setting 1212 for displaying display item 1211*a*. Display space 1220*b* is between display panels 1210*a* and 1210*b* for displaying display item 1211*b*.

FIG. 12 shows a top view of display system 1200 that includes two flat display panels 1210*a* and 1210*b*, which are installed in parallel in front of background setting 1212. In at least one embodiment, display panels 1210*a* and 1210*b* can play multimedia content and/or have a portion of the display panels 1210*a* and 1210*b* turned transparent for viewers to see through and view the display item 1211*a* and/or 1211*b*. In at least one embodiment, when both display panel 1210*a* and 1210*b* turn transparent in certain parts, viewers can see through both display panel 1210*a* and 1210*b* and observe display items 1211*a* and 1211*b* at the same time. In another embodiment, display panel 1210*a* and 1210*b* becomes transparent at different time or for different durations of time, so that display items 1211*a* and 1211*b* are displayed at different time or for different durations of time (e.g., only one display item can be seen at a particular time for a particular duration). For example, when display panel 1210*b* is transparent while display panel 1210*a* plays a video and turns opaque, only display item 1211*b* is visible.

In at least one embodiment, display system 1200 may include multiple display spaces segregated by display panels or boards to display one or more display items and/or performances. In another embodiment, a display space may be segregated partially or completely into different parts. In at least one embodiment, multiple display spaces may be arranged horizontal or vertically, one being next to another. In at least one embodiment, at least a concealed space may be installed between the display panel 1210*a* and the background setting 1212, or on the sides of display system 1200 to hide or store display items or performers when required.

Method of Use

Figure 13:
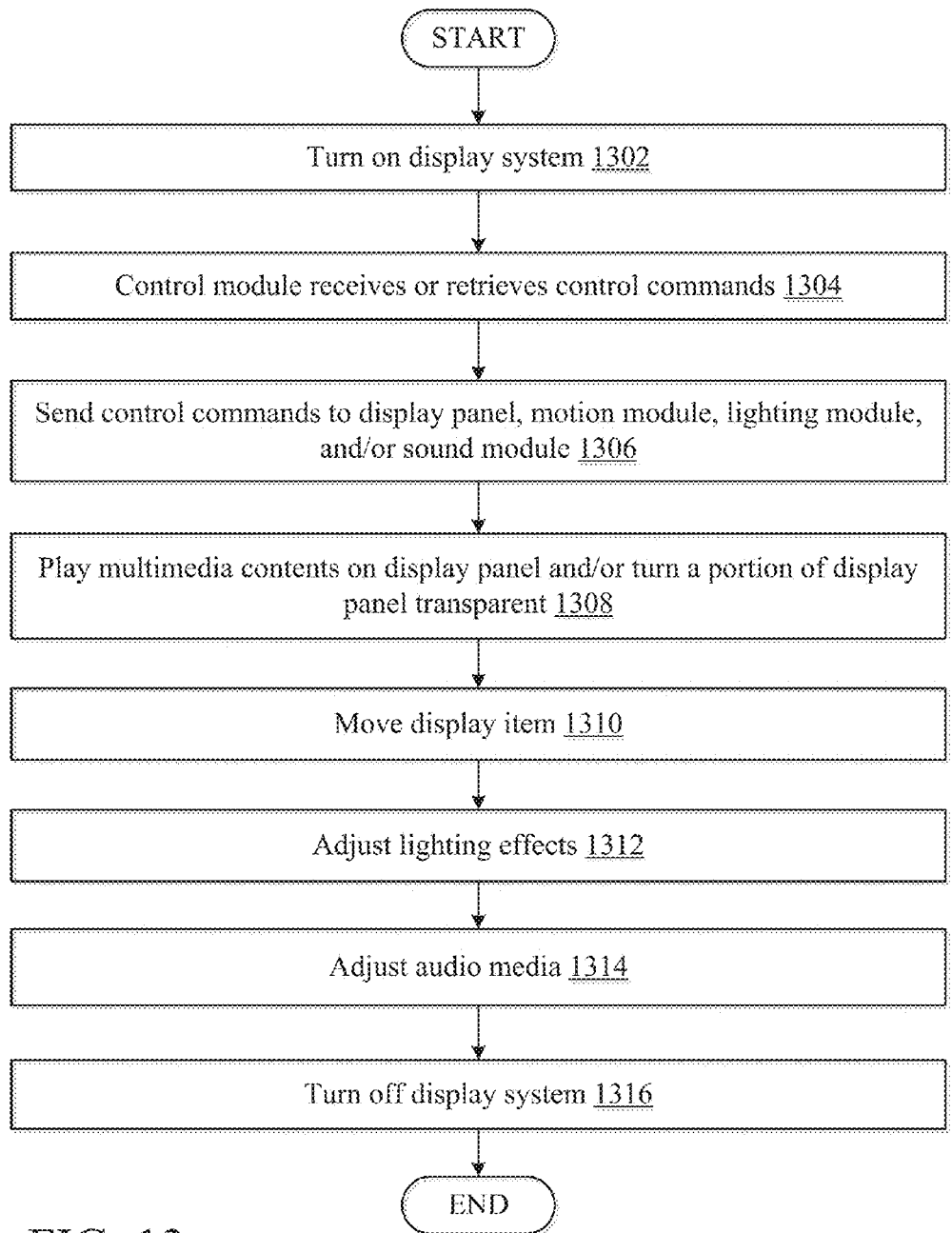
FIG. 13 shows a flowchart of an embodiment of a method of using the display system.

FIG. 13 shows a flowchart of an embodiment of a method 1300 of using the display system.

In step 1302, display system is set up for displaying display item. The display system may be an embodiment of display systems 100, 200, 300, 400*a*, 400*b*, 500, 600, 700*a*, 700*c*, 700*d*, 800, 900, 1000, 1100, and 1200. The display item is placed in display space of the display system.

In step 1302, the display system is turned on. Electricity is transmitted to the display panel and modules of the display system.

In step 1304, the control module receives control commands from external devices or retrieves control commands from programs stored in the memory system of the control module. The control commands sent to the display panel may include instructions for the display panel to play multimedia and to control transparency of the display panel. The control commands sent to the motion module, lighting module, and/or lighting module may include instructions for the motion module to move display item, instructions for the lighting module to control light effects, and/or instructions for the sound module to control audio content, respectively.

In step 1306, the control module sends control commands to display panel, motion module, lighting module, and/or sound module via wired or wireless connections.

In step 1308, the display panel, based on the control commands received from the control module, plays multimedia content on the display panel, while turns at least a portion of display panel transparent or semi-transparent so that display item is visible to viewers.

In step 1310, the motion module, based on the control commands received from the control module, moves display item in accordance with the multimedia content or requirements of exhibitions and/or performances.

In step 1312, the lighting module, based on the control commands received from the control module, controls lighting effects including turning on or off the lighting devices, adjusting brightness, color, contrast, fade-in and fade-out effects, beaming angle, and/or duration of time. Step 1312 is optional.

In step 1314, the sound module, based on the control commands received from the control module, plays sound media. Optionally as part of step 1314, the sound module adjusts the volume of the sound media. Step 1314 is optional.

In step 1316, display system is turned off when the display of exhibitions and/or performances is ended.

In an embodiment, each of the steps of method 1300 is a distinct step. In another embodiment, although depicted as distinct steps in FIG. 13, steps 1301-1316 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Method of Assembly

Figure 14:
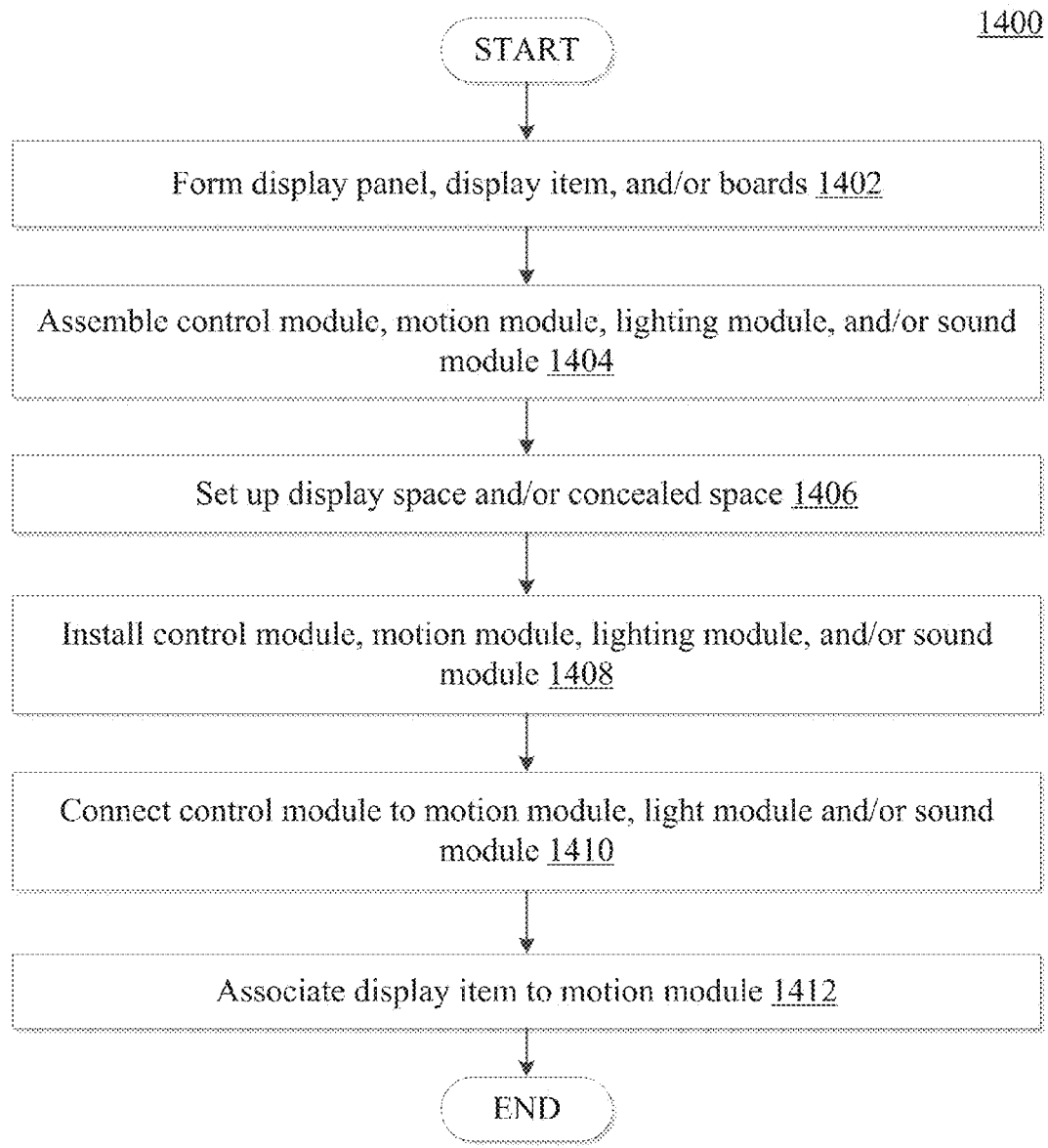
FIG. 14 shows a flowchart of an embodiment of a method of assembling the display system.
Figure 15C:
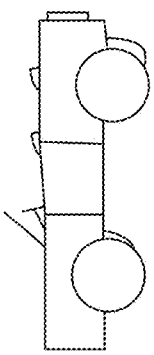
FIGS. 15A-F show a diagrams of examples that may be displayed in the display system.
Figure 15F:
Figure 15B:
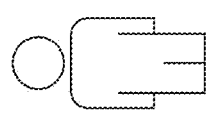
Figure 15E:
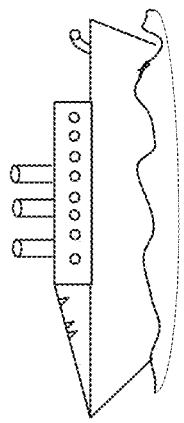
Figure 15A:
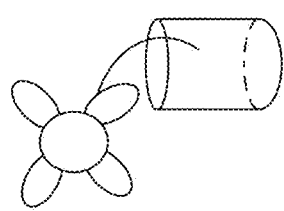
Figure 15D:
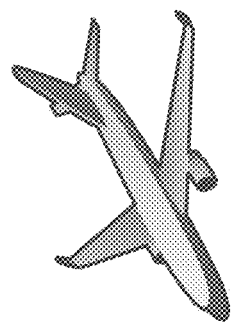

FIG. 14 shows a flowchart of an embodiment of a method 1400 of assembling the display system.

In step 1402, the display panel is formed. Optionally, the display item is formed or prepared. Optionally, one or more boards are formed for defining the display space.

In step 1404, control module, motion module, lighting module, and/or sound module are constructed and/or assembled. In at least one embodiment, the motion module may be assembled using structures and/or devices that were discussed in conjunction with FIGS. 5, 6, and 7A-D. In at least one embodiment, the lighting module may be assembled using structures and/or lighting devices that were discussed in conjunction with FIG. 8A. In other embodiments, motion module and lighting module may include other structures.

In step 1406, display space is set up using the display panel and/or boards. Alternatively, display space is set up in an environment that has structures or devices to limit the display space. Optionally, concealed space is also set up using boards or by illumination conditions as discussed in conjunction with FIG. 2. A door or gate may be installed between display space and concealed space.

In step 1408, control module, motion module, lighting module, and/or sound module are installed. In at least one embodiment, step 1408 may be part of step 1404 when motion module and/or lighting module are assembled and set up in the display system.

In step 1410, control module is connected to motion module, light module and/or sound module via wired or wireless connections.

In step 1412, display item is associated to motion module so that motion module may move display item during the exhibition and/or performances. For example, display item may be placed on a platform or turntable of motion module, or may be connected or tied to structures of motion module (e.g., tied to a rope of a pulley system of the motion module).

In an embodiment, each of the steps of method 1400 is a distinct step. In another embodiment, although depicted as distinct steps in FIG. 14, steps 1402-1412 may not be distinct steps. In other embodiments, method 1400 may not have all of the above steps and/or may have other steps in addition to or instead of those listed above. The steps of method 1400 may be performed in another order. Subsets of the steps listed above as part of method 1400 may be used to form their own method.

Alternatives and Extensions

FIGS. 15A-F show diagrams of some examples of items that may be displayed in the display system. FIGS. 15A-F include at least a pot of flower, a human being, a jeep, an airplane, a boat, and a car, respectively. In other embodiments, display system may display item(s) or performance(s) that may not have all of the elements or features listed and/or may have other elements or features instead of, or in addition to, those listed.

Figure 16:
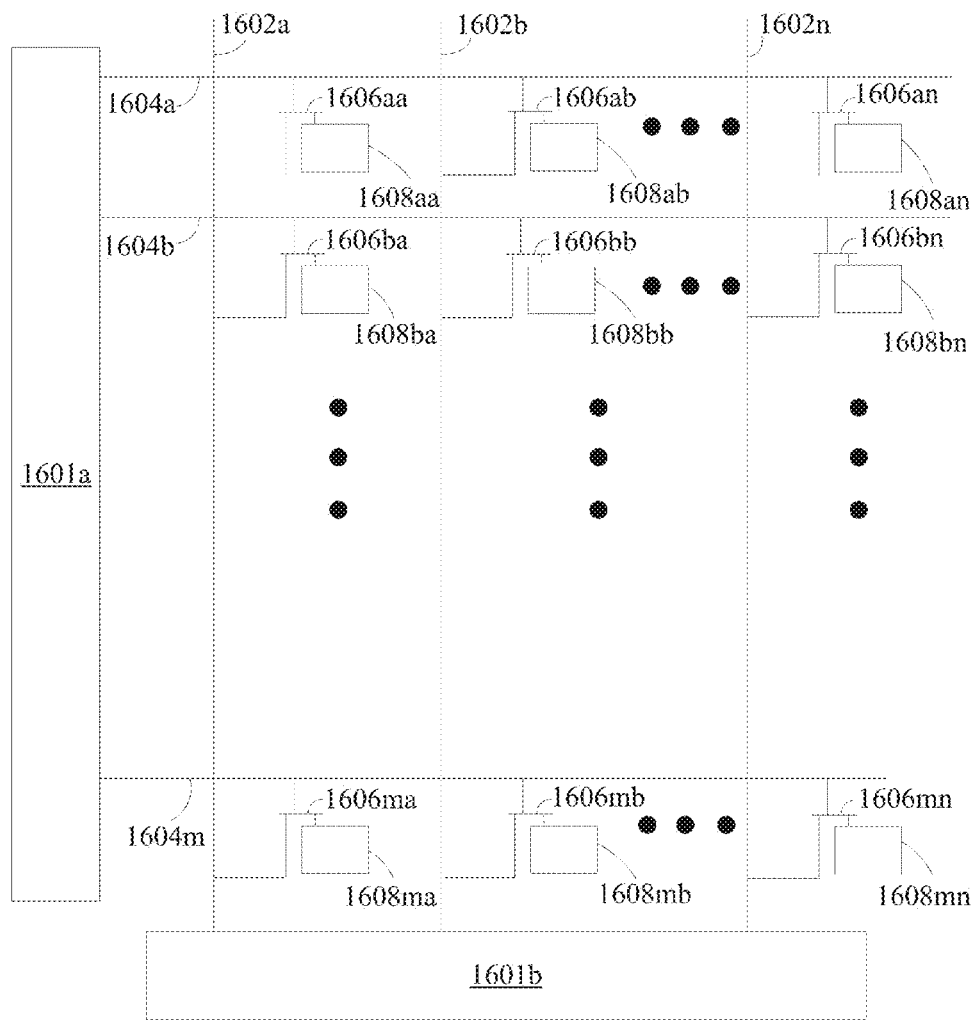
FIG. 16 shows an example of a display panel that may be used for any of the display panels of this specification.

FIG. 16 shows an example of a display panel 1600 that may be used for any of the display panels of this specification. Display panel 1600 includes row addressing circuitry 1601a, column addressing circuitry 1601b, row electrodes 1602a-n, column electrodes 1604a-m, threshold devices 1606aa-nm, and electrooptical cells 1608aa-nm. In other embodiments, the display panel 1600 may not have all of the elements or features listed and/or may have other elements or features instead of, or in addition to, those listed.

Row addressing circuitry 1601a controls which row electrodes receive an electrical signal. Column addressing circuitry 1601b controls which column electrodes receive an electrical signal. Row addressing circuitry 81a and column addressing circuitry 1601b may be controlled by a controller. Row electrodes 1602a-n carry signals to individual rows of electrodes of the individual electrooptical cells that each makes up a picture element, as determined by row addressing circuitry 1601a. Column electrodes 1604a-m carry signals to individual columns of electrodes of the individual electrooptical cells that each makes up a picture element, as determined by column addressing circuitry 1601b. Threshold devices 1606aa-nm are electronic switches that switch states when a high enough voltage and/or current is applied to one of threshold devices 1608aa-nm. For example, threshold devices 1606aa-nm may be transistors (e.g., thin film transistors) or avalanche resistors. When the voltage and/or current applied by the combination of one of row electrode and electrooptical cells 1604a-n and one of column electrodes 1604a-m is high enough, the threshold device (the one of threshold devices 1608aa-nm that is) at the intersection changes states activating the electrooptic cell at the picture element. Electrooptic cells 1608aa-nm are the electrooptic cells that make up the picture elements. Each electrooptic cell is associated with one of threshold devices 1606aa-nm. Any given electrooptic cell may be activated by sending a sufficiently high voltage or current on the correct combination or row and column electrodes that intersect at the desired electrooptic cell. Column addressing circuitry 1601b, row electrodes 1602a-n, column electrodes 1604a-m, threshold devices 1606aa-nm, and electrooptical cells 1608aa-nm may be transparent and/or small enough so as not to significantly block the passage of light and so as not to be noticed by a viewer.

Figure 17:
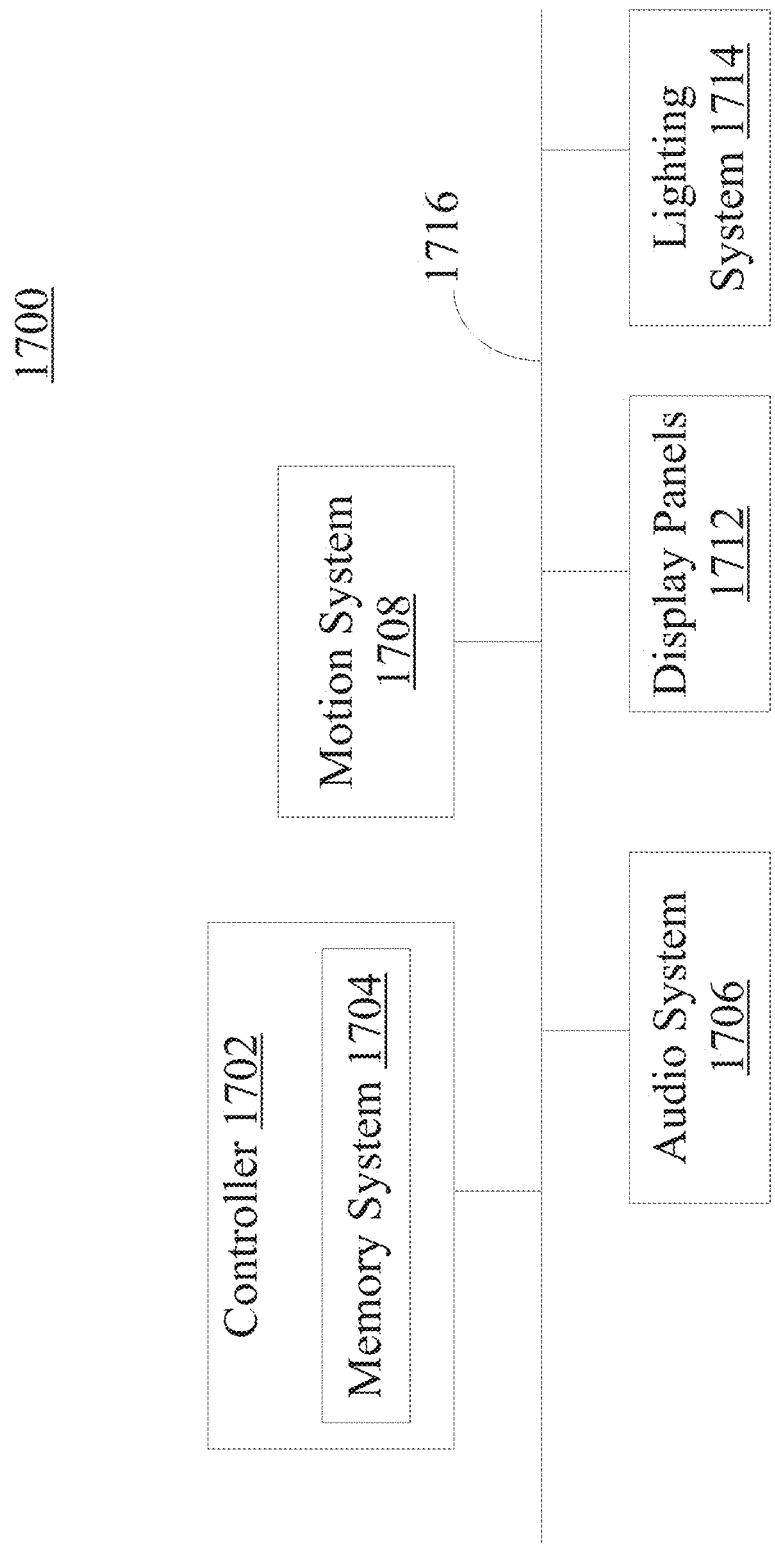
FIG. 17 shows a block diagram of an example of a circuit of display system.

FIG. 17 shows a block diagram of an example of a circuit of display system 1700. Display system 1700 may include controller 1702, memory system 1704, audio system 1706, motion system 1708, display panels 1712, lighting system 1714, and communication bus 1716. In other embodiments, display system 1700 may not have all of the elements or features listed and/or may have other elements or features instead of, or in addition to, those listed.

Display system 1700 may be any of the display system of this specification. Controller 1702 may include one or more processors and may control when each of the elements of display system 1700 is turned on, off, and/or adjusted. Controller 1702 may also control the images displayed by the display panels. Memory system 1704 may store computer instructions for turning on and off each of the elements, and/or the content that the display system, audio system, lighting system and/or motion system will play. Audio system 1706 provides sound, which may include music, voice, and/or special effect noises associated with the display. Motion system 1708 may include pulleys, pillars, racks, gears, turntables, and/or the motors that control the pulleys, pillars, racks, gears, and/or turntables. Motion system 1708 controls the motion (if any) of the display item 111 on display. Display panels 1712 are the display panels that show visual media and/or hide selective parts of the display. Lighting system 1714 includes filters, lights, turntables, and/or motors that control the position of the filters and/or lights. Communication bus 1716 carries signals between controller 1702 and audio system 1706, motion system 1708, display panels 1712, and lighting system 1714 allowing controller 1702 to control each of audio system 1706, motion system 1708, display panels 1712, and lighting system 1714 to produce a synchronized display.

In at least one embodiment, the controller 1702 may be or include any of the control modules 130, 230, 530, 630, 730, and 830, alone or in combination. There may be one controller 1702 that performs the functions of all of the control modules control modules 130, 230, 530, 630, 730, and 830 and/or may control any of control modules 130, 230, 530, 630, 730, and 830 in a master-slave relationship. In at least one embodiment, the motion system 1708 may include any one of, some of, any combination of, or all of the devices and/or structures of motion modules 140, 240, and 440. In at least one embodiment, the lighting system 1714 may include any one of, some of, any combination of, or all of the devices and/or structures of lighting modules 250 and 850. In at least one embodiment, the controller 1702, memory system 1704, audio system 1706, motion system 1708, display panels 1712, lighting system 1714, and/or communication bus 1716 may be used in any of the embodiments in this specification.

In one embodiment of display item 111 being a model of an airplane, display system may imitate the takeoff and landing process during the display of the model of airplane. Control module may use stored programs or receive control commands from external devices via an interface. To imitate the plane taking off from Beijing airport, the motion module moves the plane model from the left side of display space, for example, toward the upper right side, while the display panel plays a video of the sky view of Beijing airport and an audio of a plane taking off. As the plane model rises towards the top of the display space and slowly moving toward the right side to imitate a flying process, another video is played on the display panel showing a satellite view of Beijing that turns to a map of continents and oceans, and then to a satellite view of Los Angeles. Then the plane model is lowered to the lower right corner of display space to imitate the landing process, while another video is played on the display panel showing a view of Los Angeles airport. During the display, control module also controls the lighting module to change the color and brightness of the light on the plane model during the flight trip to imitate day and night cycles and/or weather conditions. During the display of the flight trip, the model of airplane is always visible through certain portions of the display panel, in accordance with the display of different video content. After landing of the airplane, display panel turns opaque and starts showing a video introducing the sights of Los Angeles, while motion module moves the model of airplane into a concealed space, and moves models of two children from concealed space into display space. Then display panel plays a video about a theme park in Los Angeles, while a portion of display panel turns transparent to allow viewers to see the models of children taking a tour in the theme park. Motion module may move the models of children to imitate interactions of the models of children with game machines, shops, and restaurants of the theme park shown on the display panel.

In another embodiment of display item 111 being a model of a four-wheel drive vehicle, display system may imitate the driving experience and a tour based on input information from a viewer or user. In at least one embodiment, control module receives sensing signals from one or more sensors that detects and identifies the interaction between the user and the display system. Pressure sensors may be installed to display system (or external to display system) to simulate the gas pedal of the vehicle. Tilt sensors may be installed to simulate the steering wheel of the vehicle. Optionally heat sensors may be installed to simulate selection buttons of the vehicle. Alternatively the display panel may include a touch screen for the user to make selections. When the user uses the sensors to drive the model of vehicle, motion module moves the vehicle model from the center bottom of display space, for example, upward slowly and/or in a slightly shaking manner to imitate the vehicle moving on a road. Meanwhile a video is played on the display panel showing the view of a driver on the road, with central portion of the display panel being transparent or semi-transparent so that the model of vehicle is visible to the user through the display panel. The video on the display panel may show names and photos of sights on either side of the road during the imitation of the tour or trip, while the user may press on the pressure sensor to control the speed of the model of vehicle (e.g., the faster the vehicle travels, the faster the video that shows the tour is played on display panel). The user may also turn the steering wheel having the tilt sensor to the left or right to imitate a left turn or a right turn to change to another road. When names and photos of sights and attractions are display on the display panel, the user may press the heat sensor or use the touch screen on the display panel to select which sight to go to. Based on the selection, the video on display panel shows the view of the vehicle turning into the sight and then turns opaque to play a video introducing the sight. When the display panel is opaque, the motion module moves the model of vehicle into a concealed space and moves models of people into display space. In at least one embodiment, concealed space stores multiple models of people in different dressing, which may be selected depending on which sight is selected by the user (e.g., models of people in casual clothes for tours in malls or cinemas in the city, models in sport wear for activities in sport fields, mountains, forests, rivers or lakes). Then display panel starts playing a video of the selected sight, while a portion of display panel turns transparent so that the models of people are visible to the users through display panel. Motion module may move the models of people according to the contents of video played on the display panel. Control module may further control lighting module to adjust brightness and light focus during the display. At the end of display of sightseeing or after the user selects to exit from the current display, display panel turns opaque temporarily to show a video or image, while the motion module moves models of people into concealed space and moves the model of vehicle from concealed space back into the display space. Then the video resumes the road trip and a portion of the display panel turns transparent to shows a view of the model of the vehicle.

In at least one embodiment, display system may display items from 360° angle (e.g., display system is in a pillar structure with transparent sides). In another embodiment, display system may be installed inside a wall or an enclosure with only one side having a display panel serving as a window. In at least one embodiment, concealed space and/or lighting module may be installed in any part of the wall or enclosure. In one embodiment, the display system allows only one viewer at a time, or multiple viewers at the same time. When multiple viewers watch the exhibition or performance at the same time, each viewer may have a different view angle, and thus may see certain portion of display space. In one embodiment, a part of display space may not be visible to certain viewers as a result of sideboards or light effects.

In at least one embodiment, an exhibition or a performance requires a cooperation of multiple display systems. In at least one embodiment, multiple control modules coordinate multiple motion modules, lighting modules, and/or sound modules in different display systems to create a synchronized operation. In at least one embodiment, control modules use stored or predetermined programs and/or receive control commands from external control devices. In another embodiment, control modules receives signals from external devices and/or sensors and convert the signals to control commands to move the display items, changing the lights, and/or changing multimedia contents played on the display panels.

In summary, a display system includes at least one display panel and a display space for displaying items or performances. The display system may include a control module that controls the multimedia contents played, and/or turns at least a portion of the display panel transparent for exhibiting the item or performers in display space. The control module may also control a motion module that moves items or performers during display according to different requirements of the exhibition or performance, and/or in accordance with the multimedia played on the display panel. In at least one embodiment, control module is also connected to lighting module and/or sound module for controlling light effects and/or audio effects during display, respectively. In at least one embodiment, display system coordinates multimedia contents on display panel with movements, visual effects, and/or audio effects of the display of items or performers, thus enhances the attractiveness of exhibitions and/or performances.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system, comprising:
    at least a display panel for playing multimedia contents, the display panel aligning a part of a display space for displaying at least one item, wherein at least a portion of the display panel turns transparent during display of the at least one item, wherein the at least one item is visible through the portion of the display panel that turns transparent;
    one or more devices for moving the at least one item; and
    a controller for coordinating the display panel and the one or more devices, wherein the movement of the at least one item is in coordination with the multimedia contents played on the display panel.

2. The system of claim 1, wherein
    the at least one item includes at least a performance, wherein movement of the at least a performer by the one or more devices is in accordance with the multimedia contents played on the display panel.

3. The system of claim 1, further comprising
    one or more boards for defining the display space.

4. The system of claim 3, wherein
    at least one of the one or more boards are made of opaque materials.

5. The system of claim 3, wherein
    at least one of the one or more boards are made of transparent materials.

6. The system of claim 1, wherein
    the display space includes an enclosed space.

7. The system of claim 1, wherein
    the display space is defined by at least structures of the environment, wherein the system adapts to the environment for displaying the at least one item.

8. The system of claim 7, wherein
    the structures of the environment includes at least one of walls, ceilings, floors, pillars, and frames.

9. The system of claim 1, further comprising
    one or more lighting devices for illumining at least a part of the display space; and
    wherein the controller coordinates the one or more lighting devices during the display of the at least one item, wherein the illumination is in coordination with the multimedia contents played on the display panel and movements of the at least one item.

10. The system of claim 9, wherein
    the illumination by the one or more lighting devices limits the display space, wherein areas not illumined is not part of the display space.

11. The system of claim 9, wherein
    the controller controls at least the color of the light from at least one of the one or more lighting devices.

12. The system of claim 9, wherein
    the controller controls at least the angle of the light from at least one of the one or more lighting devices.

13. The system of claim 9, wherein
    the controller controls at least the brightness of the light from at least one of the one or more lighting devices.

14. The system of claim 1, wherein
    the display panel is curved.

15. The system of claim 1, further comprising
    structures for defining at least one concealed space, wherein the at least one item is not visible when the at least one item is in the at least one concealed space.

16. The system of claim 15, wherein
    the structures that define the at least one concealed space is made of opaque materials.

17. The system of claim 15, wherein
    the at least one concealed space includes a space that is dark, wherein the at least one item is not visible when the at least one item is in the space that is dark.

18. The system of claim 15, wherein
    the one or more devices moves the at least one item between the display space and the concealed space.

19. The system of claim 15, further comprising
    at least a door between the display space and the concealed space, wherein the door opens and allows at least one of the one or more devices to move the at least one item between the display space and the concealed space.

20. The system of claim 1, wherein
    the one or more devices includes at least a pulley system for moving the at least one item.

21. The system of claim 20, wherein
    the pulley system moves on at least a track, the track limits paths of the movement of the at least one item.

22. The system of claim 1, wherein
    the one or more devices includes at least an elevation device for moving the at least one item in vertical directions.

23. The system of claim 1, wherein
    the one or more devices includes at least a turntable having an axle for moving the at least one item about the axle, the at least one item being placed on the turntable.

24. The system of claim 1, further comprising
    at least a motor for driving at least one of the one or more devices for moving the at least one item.

25. The system of claim 1, wherein
    the one or more devices includes at least a levitation device for moving the at least one item without directly contacting the at least one item.

26. The system of claim 1, wherein
    the controller including at least a digital interface for receiving signals from external devices, wherein the controller controls the display panel and the one or more devices according to the signals received.

27. The system of claim 1, further comprising
    one or more sensors for sensing signals, the one or more sensors including at least one of heat sensors, motion sensors, light sensors, tilt sensors, and pressure sensors.

28. The system of claim 27, wherein
the controller receives signals from the one or more sensors and convert the signals to control commands, wherein the controller sends control commands to the display panel and the one or more devices.

29. The system of claim 1, wherein
the display panel is a touch sensitive screen for receiving input information.

30. The system of claim 1, further comprising
at least an audio device for playing sound media in coordination with the display of the at least one item, wherein the controller controls the audio device.

31. The system of claim 1, wherein
the audio device receives control commands from the controller and adjusts volume of the sound media.

32. The system of claim 1, wherein
the display panel has two sides, wherein the display panel plays multimedia contents on at least one side of the display panel.

33. The system of claim 1, further comprising
multiple display panels, the at least one display panel being one of the multiple display panels, wherein the multiple display panels are joined together to play multimedia contents as a whole.

34. The system of claim 1, further comprising
multiple display panels segregating the display space into multiple portions for displaying multiple items.

35. A method, comprising:
playing multimedia contents on at least a display panel, the display panel aligning a part of a display space for displaying at least one item;
turning at least a portion of the display panel transparent, the at least one item being visible through the portion of the display panel that turns transparent; and
moving the at least one item by one or more devices in accordance with the multimedia contents played on the display panel.

36. The method of claim 35, further comprising
coordinating the display panel and the one or more devices by a controller, the controller sending control commands to the display panel and the one or more devices.

37. The method of claim 36, further comprising
receiving control commands by the controller from external devices.

38. The method of claim 36, further comprising
receiving signals from sensors, the sensors sensing input information, the signals being converted into control commands.

39. The method of claim 35, further comprising
adjusting light effects from one or more lighting devices in accordance with the display of the at least one item, the one or more lighting devices illuming at least a part of the display space.

40. The method of claim 35, further comprising
adjusting audio effects from one or more audio devices in accordance with the display of the at least one item.

41. The method of claim 35, the moving the at least one item by one or more devices further comprising
moving the at least one item by at least a pulley system.

42. The method of claim 41, further comprising
moving the pulley system on at least one track, and limiting paths of the movement of the at least one item on the at least one track.

43. The method of claim 35, the moving the at least one item by one or more devices further comprising
moving the at least one item by at least one elevation device in vertical directions.

44. The method of claim 35, the moving the at least one item by one or more devices further comprising
placing the at least one item on a turntable that has an axle, and moving the at least one item by the turntable about the axle.

45. The method of claim 35, the moving the at least one item by one or more devices further comprising
driving at least one of the one or more devices by at least one motor for moving the at least one item.

46. The method of claim 35, the moving the at least one item by one or more devices further comprising
moving the at least one item by at least one levitation device without directly contacting the at least one item.

47. A system, comprising:
at least a display panel for playing multimedia contents, the display panel aligning a showcase for displaying at least one item, wherein the showcase is an open or closed space where a display item is displayed, wherein at least a portion of the display panel turns transparent during display of the at least one item, wherein the at least one item is visible through the portion of the display panel that turns transparent;
one or more devices for moving the at least one item; and
a controller for coordinating the display panel and the one or more devices, wherein the movement of the at least one item is in coordination with the multimedia contents played on the display panel.

48. The system of claim 1, further comprising:
one or more boards for defining an enclosed display space and structures for defining at least one concealed space, wherein the at least one item is not visible when the at least one item is in the at least one concealed space;
one or more lighting devices for illumining at least a part of the display space, wherein the illumination is in coordination with the multimedia contents played on the display panel and movements of the at least one item;
one or more sensors for sensing signals, the one or more sensors including at least one of heat sensors, motion sensors, light sensors, tilt sensors, and pressure sensors; and
at least an audio device for playing sound media in coordination with the display of the at least one item, wherein the controller controls the audio device, wherein the controller includes at least a digital interface for receiving signals from external devices, wherein the controller controls the display panel and the one or more devices according to the signals received, wherein the controller coordinates the one or more lighting devices during the display of the at least one item.

49. The system of claim 1, wherein the controller controls the one or more devices for moving the at least one item and coordinates the movement of the at least one item with the multimedia.

50. The system of claim 1, wherein the display panel is a single layer display cell.

51. The system of claim 1, the portion of the display panel that turns transparent providing an unobstructed view of the at least one item, while the portion is transparent.

52. The system of claim 51, the portion of the display panel that turns transparent being a first portion of the display panel;

the controller being configured to cause second portion of the display panel to be opaque, while the first portion is transparent.

53. The system of claim 23, the turntable being partially below a concealed space and partially below a space visible through the portion of the display panel that turns transparent, so that as the turntable turns, the item moves on the turntable between the concealed portion and the space that is visible through the portion of the display panel that turns transparent.

* * * * *